United States Patent
Bolster et al.

(10) Patent No.: US 10,439,750 B2
(45) Date of Patent: *Oct. 8, 2019

(54) WAVELENGTH DIVISION MULTIPLEXING MODULE

(71) Applicant: CommScope Technologies LLC, Hickory, NC (US)

(72) Inventors: Kristofer Bolster, Jordan, MN (US); John T. Pfarr, Le Sueur, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,969

(22) Filed: Sep. 18, 2017

(65) Prior Publication Data

US 2018/0123722 A1    May 3, 2018

Related U.S. Application Data

(63) Continuation of application No. 14/930,332, filed on Nov. 2, 2015, now Pat. No. 9,768,900, which is a (Continued)

(51) Int. Cl.
*H04J 14/02* (2006.01)
*G02B 6/44* (2006.01)

(52) U.S. Cl.
CPC ............ *H04J 14/02* (2013.01); *G02B 6/4452* (2013.01); *G02B 6/4455* (2013.01); (Continued)

(58) Field of Classification Search
CPC ............... H04J 14/0205; H04J 14/0221; H04J 14/0201; H04J 14/02; G02B 6/4452; G02B 6/4455
See application file for complete search history.

(56) References Cited

U.S. PATENT DOCUMENTS 4,435,612 A    3/1984   Smith
5,189,410 A    2/1993   Kosugi et al.
(Continued)

FOREIGN PATENT DOCUMENTS

DE    202 01 170 U1    5/2002
EP    0 202 994 A1    11/1986
(Continued)

OTHER PUBLICATIONS

ADC Telecommunications, Inc., DSX-3 Digital Signal Cross-Connect, Doc. No. 274, dated Oct. 2004, 65 pp.
(Continued)

*Primary Examiner* — Jack Dinh
(74) *Attorney, Agent, or Firm* — Merchant & Gould P.C.

(57) ABSTRACT

A telecommunications module includes an optical wavelength division multiplexer/demultiplexer configured to demultiplex a first optical signal input into the telecommunications module into a plurality of different wavelengths, a fiber optic splitter configured to split a second optical signal input into the telecommunication module into a plurality of optical signals, and a plurality of optical add/drop filters, each of the optical add/drop filters configured to combine one of the optical signals that has been split by the fiber optic splitter and one of the wavelengths that has been demultiplexed by the optical wavelength division multiplexer/demultiplexer into a combination output signal that is output from the telecommunications module.

7 Claims, 17 Drawing Sheets

Related U.S. Application Data continuation of application No. 14/157,644, filed on Jan. 17, 2014, now Pat. No. 9,197,346, which is a continuation of application No. 13/362,210, filed on Jan. 31, 2012, now Pat. No. 8,660,429, which is a continuation of application No. 12/360,719, filed on Jan. 27, 2009, now Pat. No. 8,107,816.

(60) Provisional application No. 61/024,450, filed on Jan. 29, 2008.

(52) U.S. Cl.
CPC ...... *H04J 14/0205* (2013.01); *H04J 14/0221* (2013.01); *H04J 14/0201* (2013.01)

(56) References Cited

U.S. PATENT DOCUMENTS

| | | |
|---|---|---|
| 5,317,663 A | 5/1994 | Beard et al. |
| 5,339,379 A | 8/1994 | Kutsch et al. |
| 5,363,465 A | 11/1994 | Korkowski et al. |
| 5,432,875 A | 7/1995 | Korkowski et al. |
| 5,497,444 A | 3/1996 | Wheeler |
| 5,627,925 A | 5/1997 | Alferness et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 6,208,796 B1 | 3/2001 | Vigliaturo |
| 6,226,111 B1 | 5/2001 | Chang et al. |
| 6,263,136 B1 | 7/2001 | Jennings et al. |
| 6,307,998 B2 | 10/2001 | Vigliaturo |
| 6,363,183 B1 | 3/2002 | Koh |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,532,332 B2 | 3/2003 | Solheid et al. |
| 6,535,682 B1 | 3/2003 | Puetz et al. |
| 6,556,738 B2 | 4/2003 | Pfeiffer et al. |
| 6,556,763 B1 | 4/2003 | Puetz et al. |
| 6,591,051 B2 | 7/2003 | Solheid et al. |
| 6,614,953 B2 | 9/2003 | Strasser et al. |
| RE38,311 E | 11/2003 | Wheeler |
| 6,647,197 B1 | 11/2003 | Marrs et al. |
| 6,668,108 B1 | 12/2003 | Helkey et al. |
| 6,760,531 B1 | 7/2004 | Solheid et al. |
| 6,810,193 B1 | 10/2004 | Müller |
| 6,822,874 B1 | 11/2004 | Marler |
| 6,850,685 B2 | 2/2005 | Tinucci et al. |
| 6,885,798 B2 | 4/2005 | Zimmel |
| 7,142,764 B2 | 11/2006 | Allen et al. |
| 7,190,874 B1 | 3/2007 | Barth et al. |
| 7,194,181 B2 | 3/2007 | Holmberg et al. |
| 7,346,254 B2 | 3/2008 | Kramer et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,536,075 B2 | 5/2009 | Zimmel |
| 8,107,816 B2 | 1/2012 | Bolster et al. |
| 2002/0181896 A1 | 12/2002 | McClellan et al. |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0202765 A1 | 10/2003 | Franklin et al. |
| 2004/0240826 A1 | 12/2004 | Daoud et al. |
| 2005/0053341 A1 | 3/2005 | Zimmel |
| 2005/0067847 A1 | 3/2005 | Zellak |
| 2005/0105879 A1 | 5/2005 | Kanasaki et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2006/0083468 A1 | 4/2006 | Kahle et al. |
| 2006/0171717 A1 | 8/2006 | Kikuchi |
| 2007/0036503 A1 | 2/2007 | Solheid et al. |
| 2007/0147765 A1 | 6/2007 | Gniadek et al. |
| 2007/0189692 A1 | 8/2007 | Zimmel et al. |
| 2008/0013954 A1 | 1/2008 | Boduch et al. |
| 2009/0220231 A1 | 9/2009 | Zimmel et al. |
| 2015/0234141 A1 | 8/2015 | Bolster et al. |

FOREIGN PATENT DOCUMENTS

| | | |
|---|---|---|
| EP | 0 730 177 A2 | 9/1996 |
| EP | 0 828 356 A2 | 3/1998 |
| EP | 1 473 578 A2 | 11/2004 |
| EP | 1 589 361 A1 | 10/2005 |
| EP | 1 657 953 A2 | 5/2006 |
| GB | 2 300 978 A | 11/1996 |
| WO | WO 96/36896 | 11/1996 |
| WO | WO 00/41430 | 7/2000 |
| WO | WO 01/24432 A1 | 4/2001 |
| WO | WO 02/39170 A2 | 5/2002 |
| WO | WO 03/093889 A1 | 11/2003 |
| WO | WO 2006/127397 A1 | 11/2006 |

OTHER PUBLICATIONS

ADC Telecommunications, Inc., OmniReach FTTP Solutions, Doc. No. 1276550, dated May 2004, 12 pp.

Prosecution History of U.S. Appl. No. 10/980,978 (OA dated Dec. 15, 2005; Resp. dated Jun. 15, 2006; OA dated Sep. 6, 2006; Resp. dated Mar. 6, 2007; OA dated Jun. 1, 2007; Resp. Nov. 16, 2007; Notice of Allowance dated Apr. 2, 2008; Issue Fee Payment and 312 Amendment dated Apr. 1, 2008; Response to 312 Communication dated Apr. 18, 2008).

Prosecution History of U.S. Appl. No. 11/138,063 (OA dated Dec. 27, 2006; Resp. dated Apr. 27, 2007; OA dated Jul. 30, 2007; Resp/RCE dated Nov. 16, 2007; Notice of Allowance dated Dec. 13, 2007; Issue Fee Payment and 312 Amendment dated Mar. 13, 2008; Examiner's Amendment dated Mar. 14, 2008; Examiner's Amendment dated Mar. 24, 2008; Communication/312 Amendment Considered dated May 27, 2008).

Prosecution History of U.S. Appl. No. 11/138,889 (OA dated Dec. 14, 2005; Resp. dated Jun. 14, 2006; OA dated Sep. 11, 2006; Resp. dated Mar. 12, 2007; OA dated Jun. 13, 2007; Resp. dated Nov. 16, 2007; Notice of Allowance dated Apr. 18, 2008; Issue Fee Payment dated Apr. 17, 2008; Certificate of Correction Request dated Sep. 9, 2008).

Prosecution History of U.S. Appl. No. 11/215,837 (OA dated Jul. 28, 2006; Resp. dated Oct. 30, 2006; OA dated Jan. 26, 2007; Resp. dated Apr. 26, 2007; Notice of Allowance dated Aug. 2, 2007; Issue Fee Payment dated Jan. 18, 2008).

Prosecution History of U.S. Appl. No. 11/354,297 (OA dated Jun. 25, 2007; Resp. dated Nov. 16, 2007; Notice of Allowance dated Dec. 14, 2007; RCE w/IDS dated Mar. 14, 2008; Notice of Allowance dated Apr. 22, 2008; Issue Fee Payment dated Jul. 22, 2008).

Prosecution History of U.S. Appl. No. 11/975,905 (OA dated Jun. 24, 2008; Resp. dated Sep. 24, 2008).

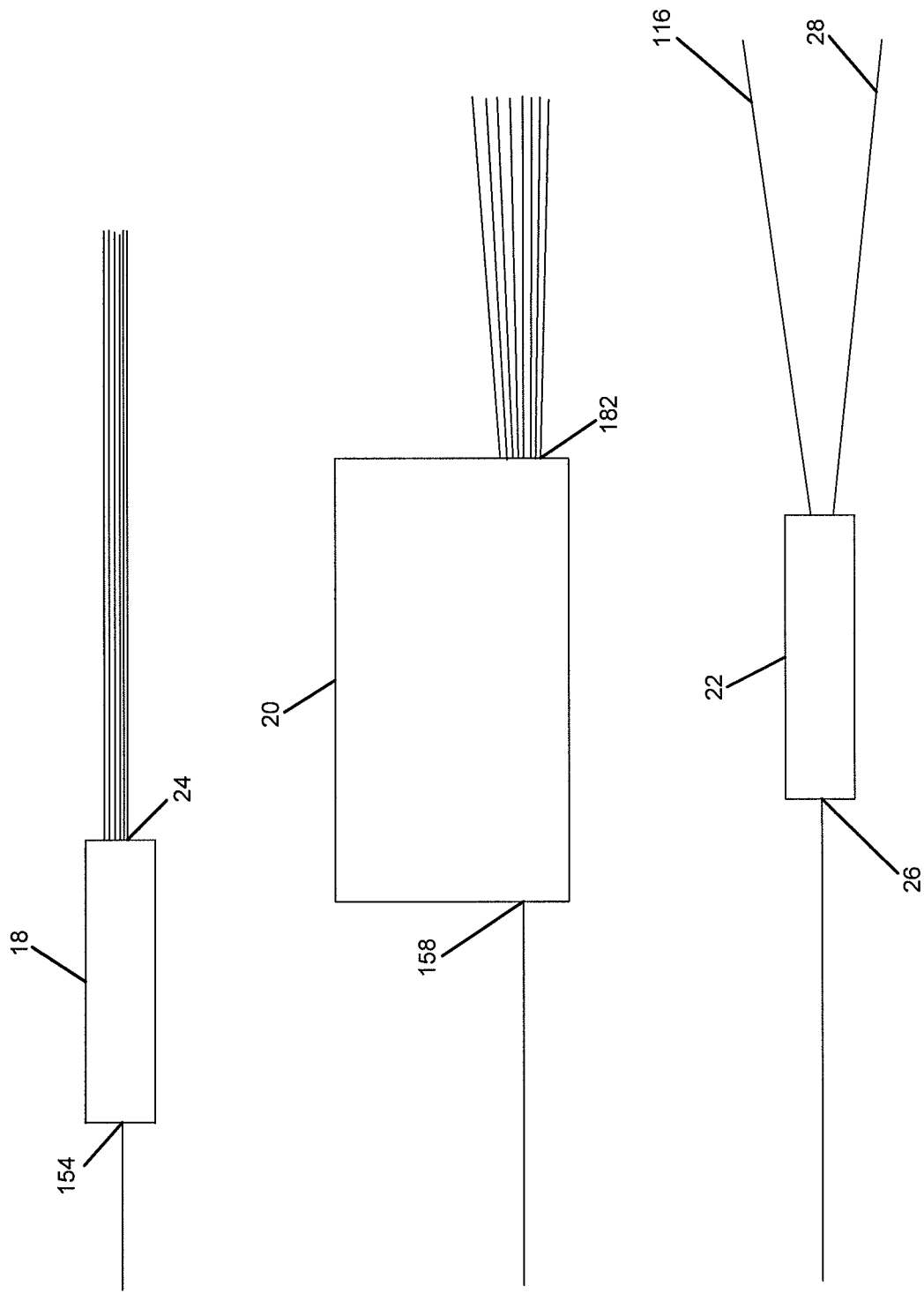

WAVELENGTH DIVISION MULTIPLEXING MODULE

CROSS REFERENCE TO RELATED APPLICATION

This application is a continuation of U.S. patent application Ser. No. 14/930,332, filed Nov. 2, 2015, now U.S. Pat. No. 9,768,900, which is a continuation of U.S. patent application Ser. No. 14/157,644, filed Jan. 17, 2014, now U.S. Pat. No. 9,197,346, which is a continuation of U.S. patent application Ser. No. 13/362,210, filed Jan. 31, 2012, now U.S. Pat. No. 8,660,429, which is a continuation of U.S. patent application Ser. No. 12/360,719, filed Jan. 27, 2009, now U.S. Pat. No. 8,107,816, which application claims the benefit of U.S. Provisional Patent Application Ser. No. 61/024,450, filed Jan. 29, 2008, which applications are hereby incorporated by reference in their entireties.

FIELD

The present disclosure generally relates to fiber optic telecommunications equipment. More specifically, the present disclosure relates to modules for housing fiber optic telecommunications equipment.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While a chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

It is also desirable for the chassis to be configured to ensure that modules are installed correctly and aligned with other components within the chassis to mate with the pre-connectorized and pre-installed transmission cables.

In fiber-optic communications, it is also common for optical signals of transmission cables to be multiplexed. Wavelength division multiplexing (WDM) is a technology which multiplexes multiple optical carrier signals on a single optical fiber by using different wavelengths of laser light to carry different signals. This allows for a multiplication in capacity, in addition to making it possible to perform bidirectional communications over one strand of fiber.

A WDM system uses a multiplexer at the transmitter to join signals together and a demultiplexer at the receiver to split them apart. With the right type of fiber, it is possible to have a device that does both simultaneously, and can function as an optical add-drop multiplexer. WDM systems allow expansion of the capacity of the network without laying more fiber.

WDM systems are divided in different wavelength patterns: 1) conventional WDM; 2) dense WDM (DWDM); and 3) coarse WDM (CWDM). WDM, DWDM and CWDM are based on the same concept of using multiple wavelengths of light on a single fiber, but differ in the spacing of the wavelengths, number of channels, and the ability to amplify the multiplexed signals in the optical space.

In certain telecommunications applications, it might be desirable to combine wavelength division multiplexing technology with fiber optic signal splitting technology.

SUMMARY

The present invention relates to telecommunications equipment that combines wavelength division multiplexing technology and fiber optic signal splitting technology and packages it in a modular format. The module of the present disclosure includes an input for inputting a fiber optic signal to be split into multiple strands, an input for inputting a fiber optic signal to be demultiplexed into different wavelengths of laserlight, and an output for outputting a combination signal wherein a split signal and a demultiplexed wavelength are combined into a single output fiber.

According to one aspect, the module includes within the interior an optical multiplexer/demultiplexer, a fiber optic splitter, and an optical device for combining a split signal and a demultiplexed wavelength into an output fiber.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows:

FIG. 13 is a diagram illustrating a fiber optic splitter configured for use in the WDM module of FIG. 1;

FIG. 14 is a diagram illustrating a multiplexer chip configured for use in the WDM module of FIG. 1;

FIG. 15 is a diagram illustrating an optical add/drop filter configured for use in the WDM module of FIG. 1, the add/drop filter configured to combine a split signal and a demultiplexed wavelength into a single output fiber;

DETAILED DESCRIPTION

Reference will now be made in detail to exemplary aspects of the present disclosure which are illustrated in the accompanying drawings. Wherever possible, the same reference numbers will be used throughout the drawings to refer to the same or similar parts.

FIGS. 1-4 illustrate a telecommunications module 10 having features that are examples of inventive aspects in accordance with the present disclosure. Since one of the telecommunications equipment housed by the module 10 is a fiber optic wavelength division multiplexer/demultiplexer, the telecommunications module 10 may also be referred to herein as a fiber optic wavelength division multiplexing (WDM) module 10. The WDM module 10 is configured to be inserted within a telecommunications chassis similar to the chassis shown and described in commonly-owned U.S. Pat. No. 7,536,075, the disclosure of which is incorporated herein by reference in its entirety. As will be described in further detail below, the WDM module 10 is also configured to be inserted into the telecommunications chassis in a similar manner to that shown and described in the U.S. patent application Ser. No. 11/975,905.

The WDM module 10 of the present disclosure is configured to power split an input signal into a plurality of signals. The WDM module 10 is also configured to demultiplex a second input signal into a plurality of wavelengths. An optical device 22 (e.g., an optical add/drop filter, a single channel filter, etc.) within the module 10 is configured to combine one of the power split signals and one of the demultiplexed wavelengths into a combination output signal that is output through the module 10. The powersplitting function, the demultiplexing function and the signal combination function are all performed within the module 10.

Figure 1:
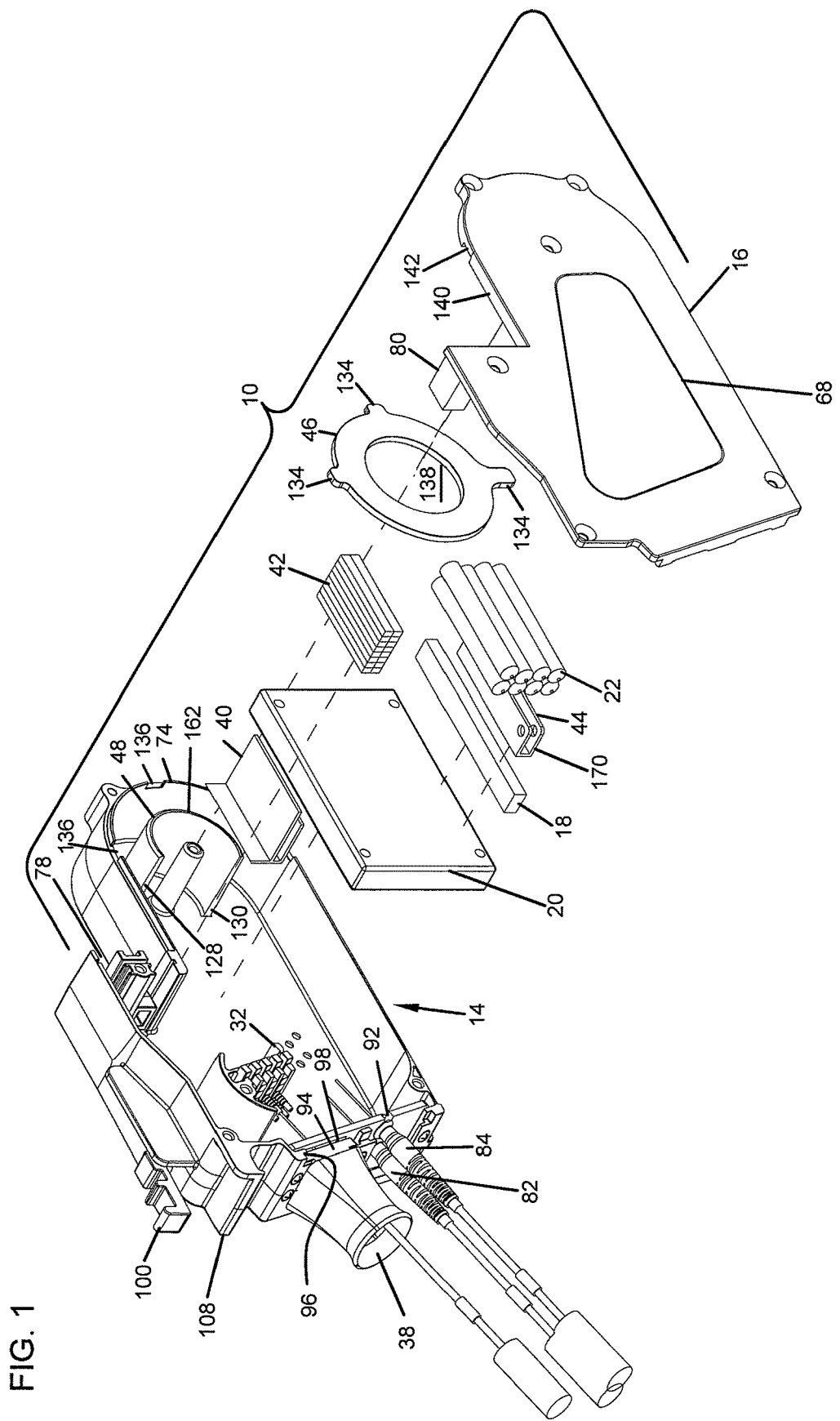
FIG. 1 is an exploded view of a fiber optic wavelength-division multiplexing (WDM) module having features that are examples of inventive aspects in accordance with the present disclosure.

Referring to FIG. 1, the WDM module 10 is shown in an exploded orientation. WDM module 10 includes a module housing 12 that includes a main housing portion 14 and a removable cover 16. The module housing 12 including the main housing portion 14 and the removable cover 16 is illustrated separately in FIG. 5, without the internal components of the module 10.

Still referring to FIG. 1, the WDM module 10 is configured to house a fiber optic splitter 18, a multiplexer/demultiplexer chip 20, and a plurality of optical devices 22 configured to combine a split signal and a demultiplexed wavelength into a single output signal. According to one embodiment, the optical devices 22 that are configured to combine a split signal and a demultiplexed wavelength into a single output signal may be optical add/drop filters. Optical add/drop filters and their uses are known in the art. The optical add/drop filters may also be called single channel filters. Other types of devices performing the same function are possible.

The fiber optic splitter 18 is adapted to power split a first input fiber optic signal entering the module 10 into multiple strands. The multiplexer/demultiplexer chip 20 is configured to demultiplex a second input fiber optic signal entering the module 10 into different wavelengths of laserlight. Each of the optical devices 22 (e.g., add/drop filters) is configured to combine one of the split signals and one of the demultiplexed wavelengths into a single output fiber. Each of the combination signals are then output from the module 10. In the embodiment shown, the fiber optic splitter 18 is a 1×8 splitter and the multiplexer/demultiplexer 20 is an 8-channel chip. Accordingly, in the embodiment of the module 10 shown, 1 splitter input signal and 1 multiplexer input signal get output as 8 separate combination signals.

Figure 12:
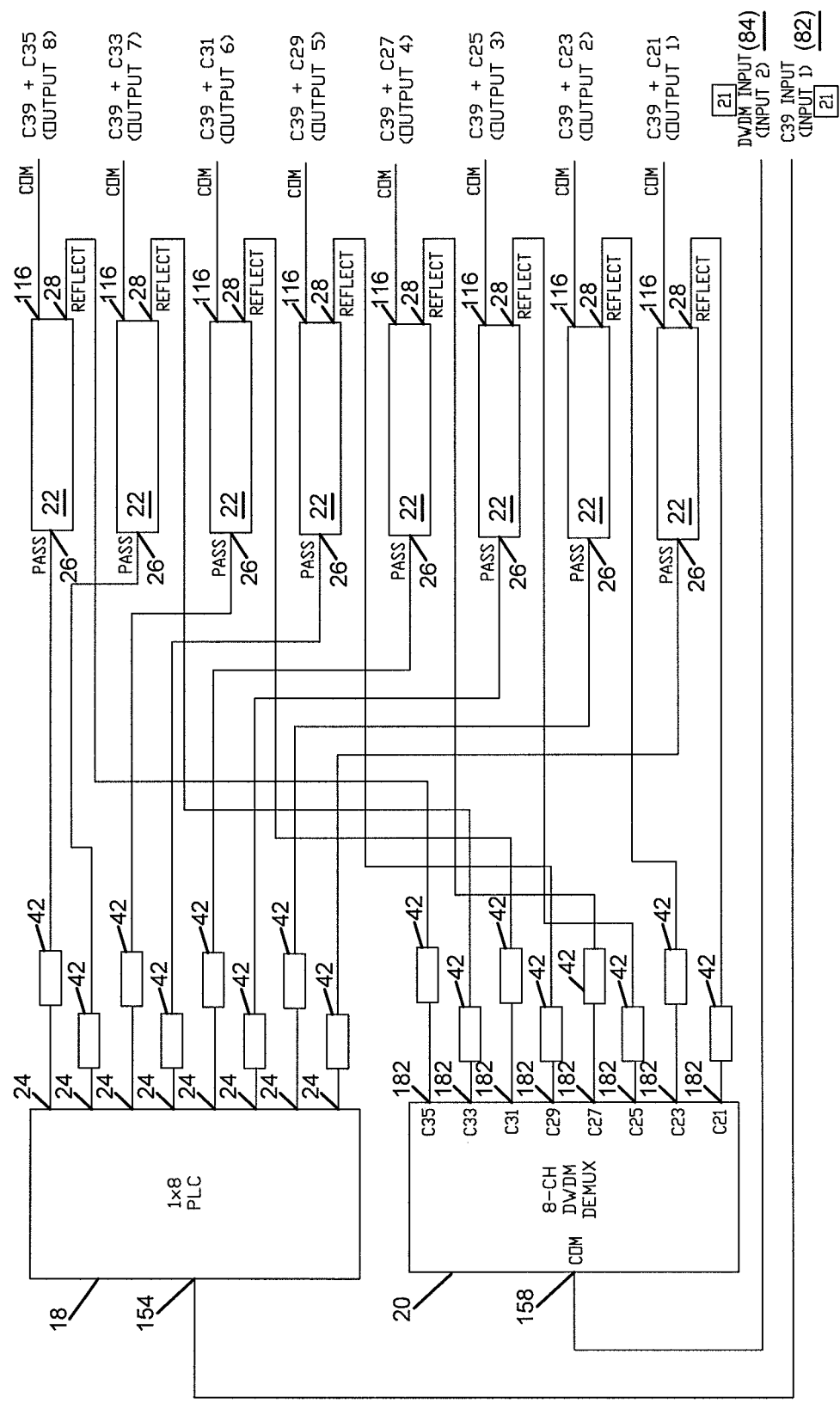
FIG. 12 is a schematic view illustrating the fiber optic circuit of the WDM module of FIG. 1.

A fiber optic circuit diagram of the WDM module 10 of FIGS. 1-4 is shown in FIG. 12. FIG. 13 diagrammatically illustrates the fiber optic splitter 18 configured for use in the WDM module 10. FIG. 14 diagrammatically illustrates the multiplexer chip 20 configured for use in the WDM module 10. FIG. 15 diagrammatically illustrates one of the add/drop filters 22 configured for use in the WDM module 10 of FIG. 1, wherein the add/drop filter 22 is configured to combine a split signal and a demultiplexed wavelength into an output signal.

According to one example embodiment shown in FIG. 12, a signal input into the fiber optic splitter 18 gets split into 8 separate signals, each separate signal being the same as the original input signal. It should be noted that in other embodiments, the fiber optic splitter 18 may power split the signal into different power levels, rather than into the same signal. From an output 24 of the splitter 18, each of the split signals get spliced into an input 26 (i.e., PASS leg) of each of the add/drop filters 22. Likewise, a signal input into the multiplexer chip 20 gets demultiplexed into 8 different wavelengths. Each wavelength gets output from the multiplexer chip 20 as a separate signal and is spliced into another input 28 (i.e., REF leg) of the each of the add/drop filters 22. The signals from the splitter 18 and the multiplexer chip 20 are combined at the add/drop filters 22 and output from the add/drop filters 22 (e.g., at COM leg) as 8 combination signals.

Figure 2:
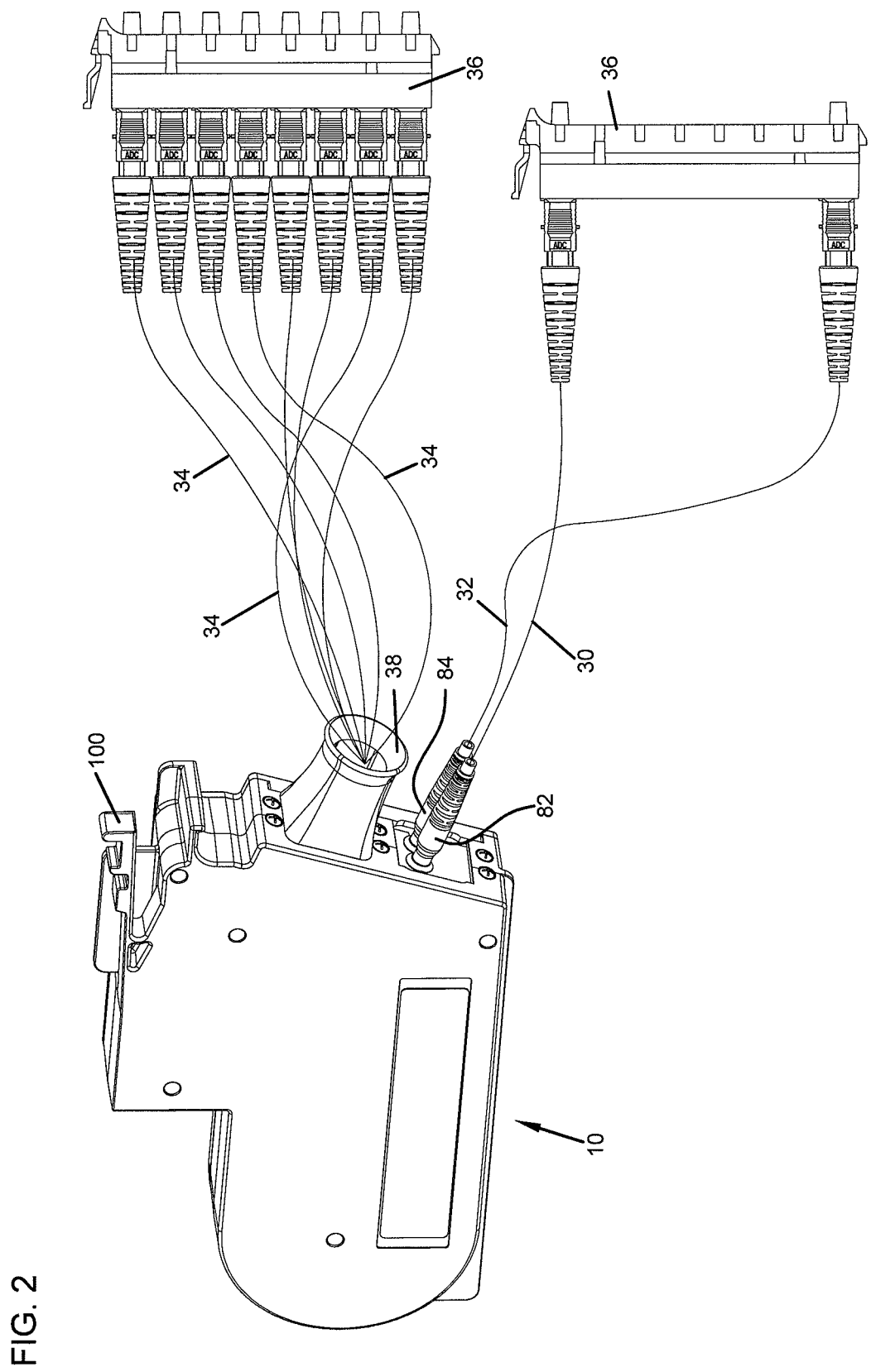
FIG. 2 illustrates the WDM module of FIG. 1 in a fully assembled configuration including the input and the output signals going into and a coming out of, respectively, the module.

FIG. 2 illustrates the WDM module 10 with the two input signal cables 30, 32 going into the module 10 and the eight combination output signal cables (each one designated as "34") coming out. As shown, the input cables 30, 32 and the output cables 34 may be connectorized and be forwarded on to appropriate locations through fiber optic adapters 36. As shown in FIG. 2, the module housing 12 includes a cable exit 38 for outputting the combination fiber optic signals out of the module 10 and to customers.

Referring back to FIG. 1, the WDM module 10 includes a number of cable management/routing features for correctly orienting the cables within the module 10, as will be described in further detail below. One such feature is a splice holder/cable management structure 40 that is configured to house the plurality of fiber optic splices 42 within the module 10 and also route fiber optic cables through the module 10 (shown in further detail in FIGS. 6-8). Another cable routing feature is a cable management structure 44. In the depicted embodiment, the cable management structure is shown located between the fiber optic splitter 18 and the add/drop filters 22 (shown in further detail in FIGS. 9-11). In other embodiments, the cable management structure 44 could be located between the fiber optic splitter 18 and the bottom wall 54 of the module 10. A fiber retainer 46 that is removably mounted to the main housing portion 14 of the module housing 12 is also shown in FIG. 1. The fiber retainer 46 helps keep cables spooled around a first radius limiter 48 within the main housing 14 of the module 10.

Figure 3:
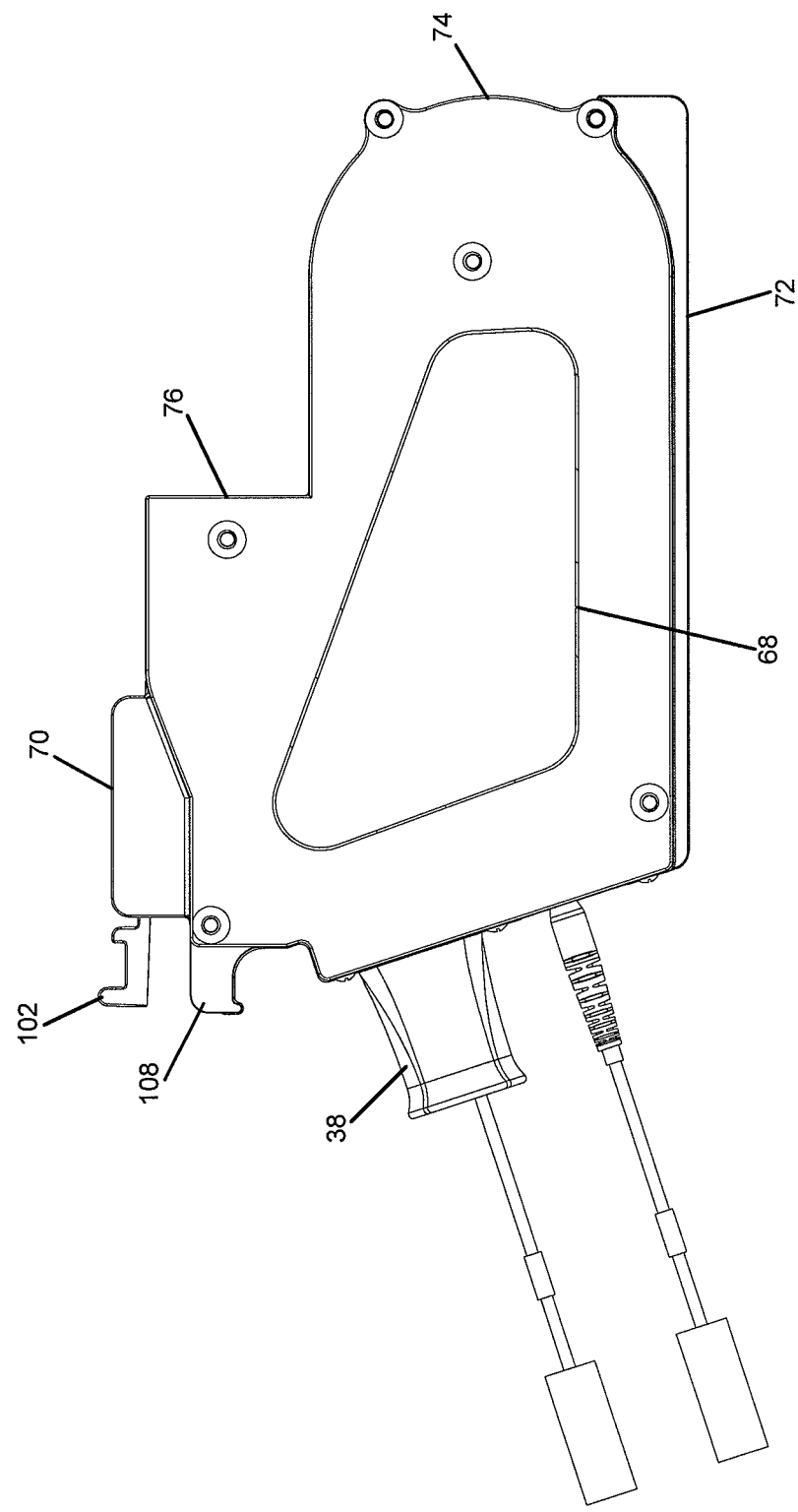
FIG. 3 is a right side view of the WDM module of FIG. 1.
Figure 4:
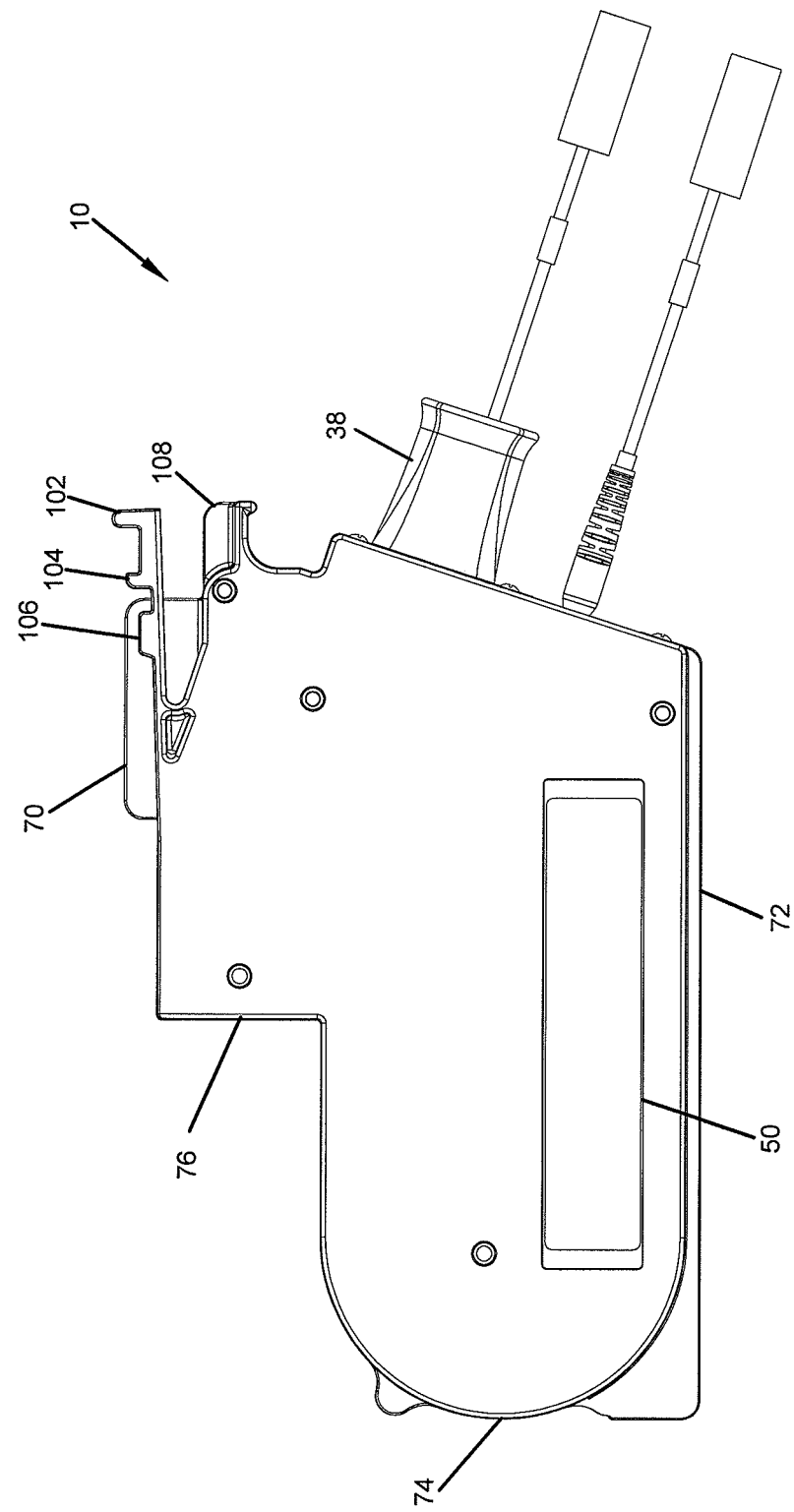
FIG. 4 is a left side view of the WDM module of FIG. 1.

FIGS. 2-4 illustrate the module 10 in a fully assembled configuration with the cover 16 mounted on the main housing portion 14.

Figure 5:
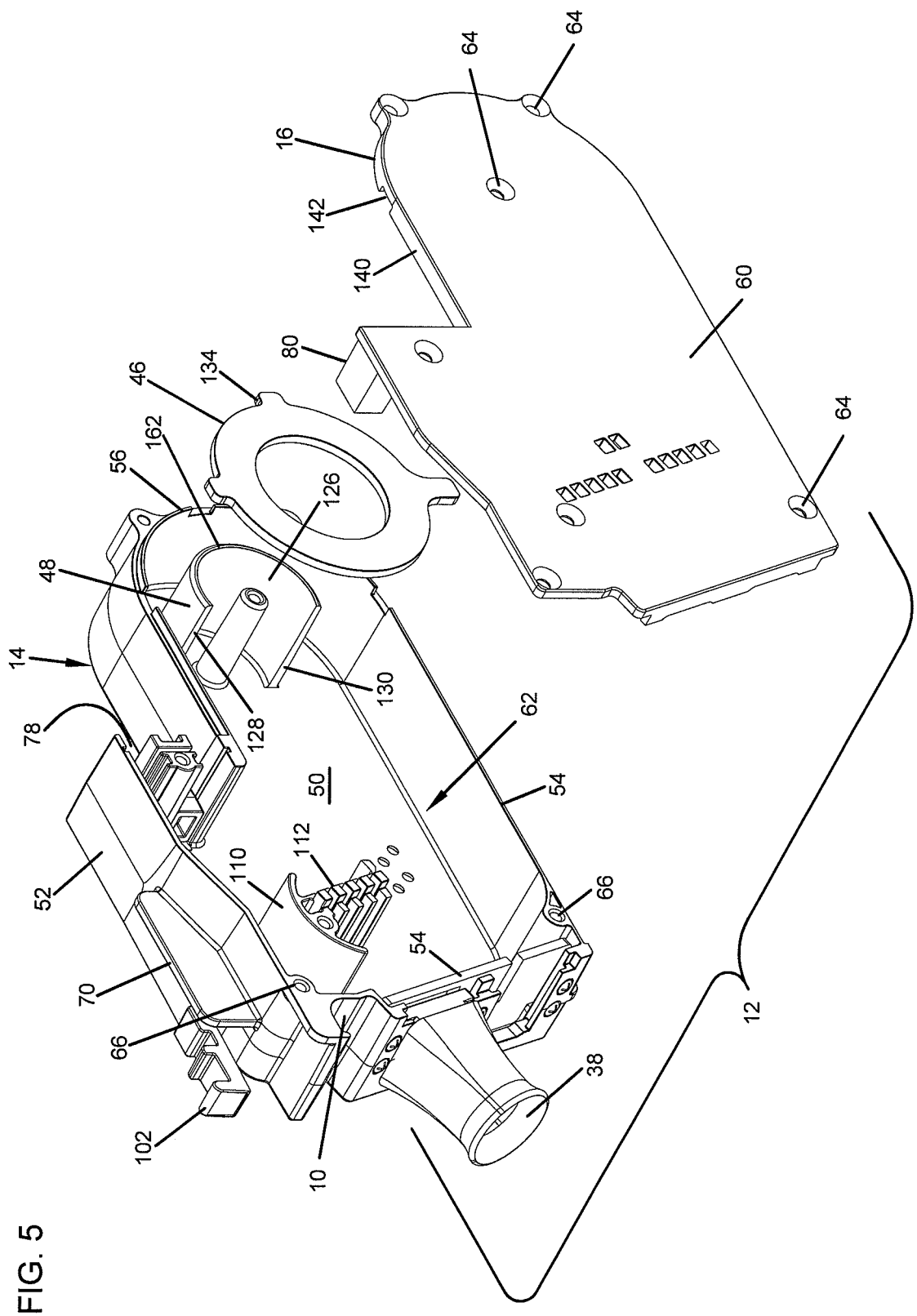
FIG. 5 is an exploded view of a module housing of the WDM module of FIG. 1.

FIG. 5 illustrates the housing 12 of the module 10 in isolation, with the internal features of the module 10 removed therefrom. Referring to FIG. 5, the main housing portion 14 defines a first sidewall 50 extending between a top wall 52, a bottom wall 54, a rear wall 56, and a front wall 58. Removable cover 16 defines a second sidewall 60 of the module housing 12 and closes off an open side 62 of the module main housing portion 14. Cover 16 is mounted to main housing portion 14 by fasteners through fastener holes 64 in the cover 16 and fastener mounts 66 defined on main housing portion 14. The cover 16 may include a label 68 placed thereon with indicia relating to the module 10 (see FIGS. 1 and 3).

The main housing portion 14 defines a top mounting flange 70 and a bottom mounting flange 72 of the WDM module 10 extending from the top and bottom walls 52, 54, respectively. As discussed previously, the WDM module 10 of the present application is configured for insertion into a chassis similar to the one described in U.S. patent application Ser. No. 11/975,905 and in a similar manner to that described therein. As such, similar to the modules and the chassis described in U.S. patent application Ser. No. 11/975,905, the bottom flange 72 and a corresponding slot on the chassis are smaller in size than top flange 70 and the corresponding top slot on the chassis. Bottom slot of the chassis is sized such that, while bottom flange 72 fits into the bottom slot of the chassis, the larger top flange 70 does not fit. This ensures that the WDM module 10 is positioned within a front opening of a chassis in a particular desired orientation to correctly position the cable inputs and the outputs relative to the chassis.

It should also be noted that while the housing 12 of the WDM module 10 of the present application is configured similarly to those of the modules shown in described in U.S. patent application Ser. No. 11/975,905 for mounting purposes, the WDM module 10 of the present application has certain differences. The WDM module housing 12 of the present application has the depth of two of the modules of U.S. patent application Ser. No. 11/975,905. As such, the WDM module 10 of the present application occupies two mounting locations within a chassis such as the chassis shown in U.S. patent application Ser. No. 11/975,905.

Still referring to FIG. 5, the rear wall 56 of main housing portion 14 includes a curved portion 74 configured to provide bend radius protection to cables within interior of the module 10. Similar to modules of U.S. patent application Ser. No. 11/975,905, the rear wall 56 of main housing 14 includes an inset portion 76. The inset portion 76 might be used to accommodate a pair of fiber optic connectors protruding out of the rear wall 56, if, for example, a rear input configuration is desired instead of a front input configuration. It should be noted that in the depicted embodiment, the WDM module 10 includes a front input configuration. Thus, the slots 78 for receiving fiber optic connectors at the rear wall 56 may be covered with inserts 80 (see FIG. 5). In U.S. patent application Ser. No. 11/975,905, the modules are shown with a rear input configuration wherein rear fiber optic connectors protrude from the rear wall at the inset portion of the module housing. As noted before, a rear input configuration is certainly one option for the WDM module 10 of the present application. In such a configuration, fiber optic connectors protruding rearwardly from rear wall 56 would mate with fiber optic adapters of adapter assemblies that are mounted within the chassis.

Figure 16:
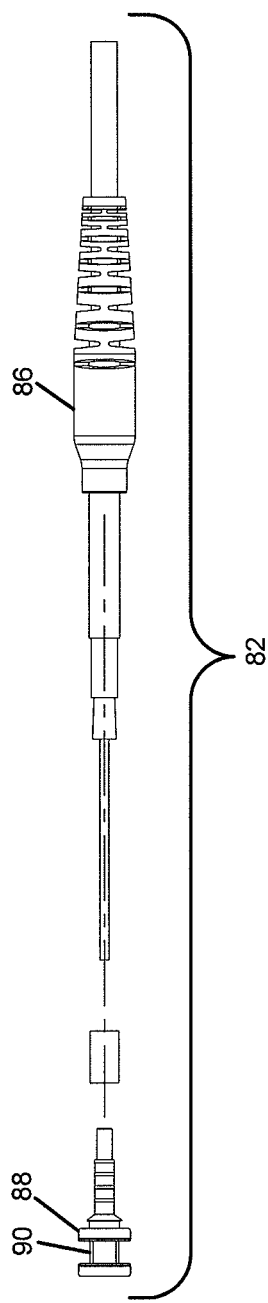
FIG. 16 is an exploded view of an input connection for inputting a signal into the splitter of the WDM module of FIG. 1.
Figure 17:
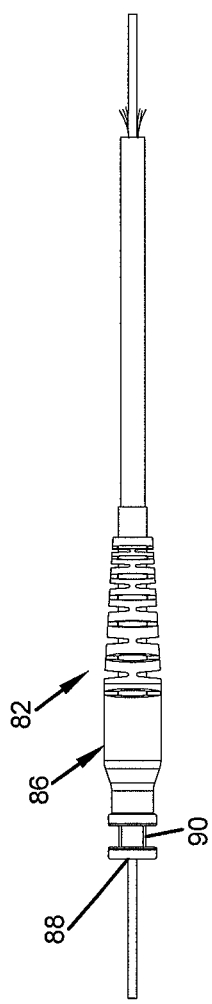
FIG. 17 illustrates the input connection of FIG. 16 in a fully assembled configuration.
Figure 19:
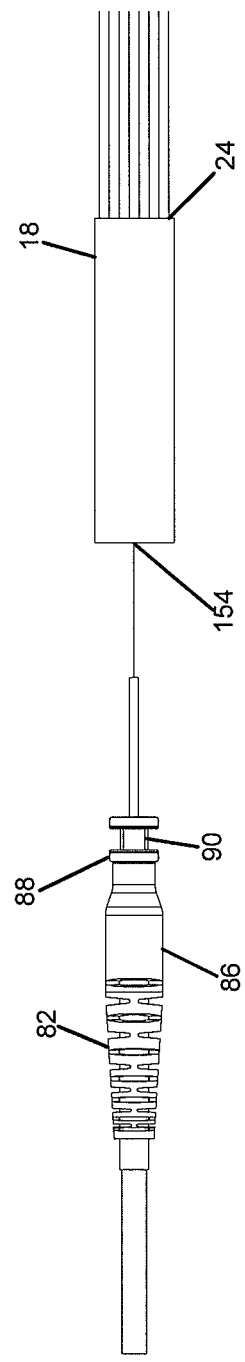
FIG. 19 is a diagram illustrating the input connection of FIG. 17 with the fiber optic circuit of the fiber optic splitter configured for use with the WDM module.

Still referring to FIG. 5, in the depicted embodiment, the input connections 82, 84 are provided at the front of the module main housing 14. FIG. 16 illustrates an exploded view of an input connection 82 for inputting a signal into the splitter 18 of the WDM module 10 and FIG. 17 illustrates the input connection 82 of FIG. 16 in a fully assembled configuration. FIG. 19 is a diagram illustrating the input connection 82 with the fiber optic splitter 18 configured for use in the WDM module 10.

Figure 18:
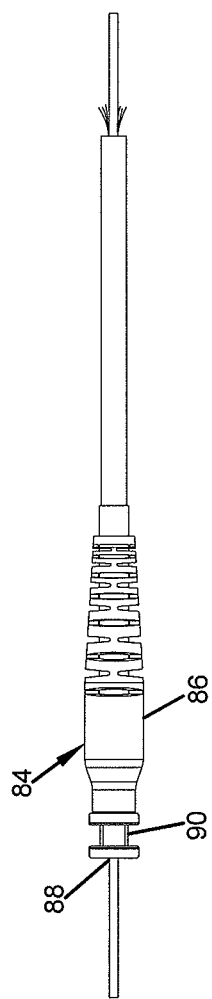
FIG. 18 illustrates an input connection in a fully assembled configuration for inputting a signal into the multiplexer chip of the WDM module to be demultiplexed into different wavelengths of laserlight.
Figure 20:
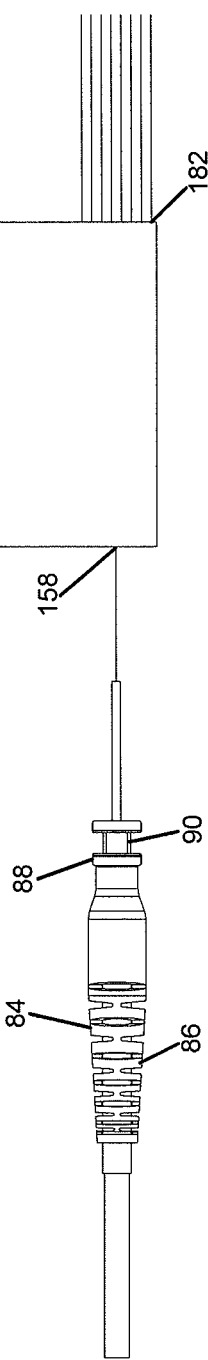
FIG. 20 is a diagram illustrating the input connection of FIG. 18 with the fiber optic circuit of the multiplexer chip configured for use with the WDM module.

FIG. 18 illustrates a fully assembled view of the input connection 84 for inputting a signal into the multiplexer chip 20 of the WDM module 10 to be demultiplexed into different wavelengths of laserlight. FIG. 20 is a diagram illustrating the input connection 84 with the multiplexer chip 20 configured for use in the WDM module 10.

As shown in FIGS. 16-20, each input connection 82, 84 (whether for the fiber optic splitter 18 or the multiplexer chip 20) includes a boot 86 that mates with a crimp element 88. The crimp element 88 defines a circumferential notch 90 (i.e., recessed portion). The circumferential notch 90 is slidably inserted into a slot 92 defined on an insert piece 59 that is fastened to the front wall 58 of the main housing portion 14 with fasteners (see FIGS. 1 and 5). The crimp elements 88 of the input connections 82, 84 are captured by the cover 16 when the cover 16 is mounted on the main housing 14.

As mentioned previously, the embodiment of the WDM module 10 illustrated includes the cable exit 38 at the front of module main housing 14 (see FIG. 1). The cable exit 38 is slidably mounted to main housing 14 of the WDM module 10 and is captured by the cover 16 when cover 16 is mounted to main housing 14. The cable exit 38 defines a protruding rear lip 94 that is slidably inserted into a slot 96 defined around a front aperture 98 defined at the front wall 58 for accommodating the cable exit 38. The cable exit 38 permits telecommunications cables within the module 10 to be directed outside of the module 10. The cable exit 38 is preferably sized to fit within the profile of the WDM module 10 to preserve the density of a telecommunications assembly having a plurality of modules 10 mounted adjacent to each other.

The front wall 58 of the module main housing 14 is angled with regard to a front opening of a chassis, which may aid in directing cables entering and exiting the WDM module 10 toward a desired location. In other embodiments, front walls could be made generally parallel to a front of chassis within the scope of the present disclosure.

As noted above, the WDM module 10 of the present application includes similar features to those modules shown and described in U.S. patent application Ser. No. 11/975,905 for mounting purposes. As such, the main housing portion 14 includes an integrally formed flexible latch 100 (i.e., cantilever arm) that is adapted to engage a portion of a chassis to hold module 10 within a front opening of the chassis. Flexible latch 100 also deflects to permit withdrawal of the module 10 from a chassis. The flexible latch 100 of the module 10 is constructed similarly to that of modules of U.S. patent application Ser. No. 11/975,905 and includes a finger grip tab 102, a front latching tab 104 and a rear latching tab 106 that cooperate with a bulkhead at a mounting location of a chassis. The WDM module 10 also includes a fixed grip tab 108 opposing and adjacent to flexible latch 100 to aid removal of module 10 from chassis. Fixed grip tab 108 is preferably positioned on module 10 opposite latch 100 so that a user may apply opposing force on latch 100 and fixed grip tab 108 to securely grasp module 10 and remove it from a chassis with two adjacent fingers of the hand. The insertion of the WDM module 10 into a chassis is similar to that of modules described in U.S. patent application Ser. No. 11/975,905.

Now referring back to FIG. 5, within interior of main housing 14, module includes a first radius limiter 48 adjacent the curved portion 74 of rear wall 56 of main housing 14. The WDM module 10 includes a second radius limiter 110 adjacent front wall 58 of housing 12 near the cable exit 38. As will be discussed in further detail below, the radius limiters 48, 110 provide bend-protection to fiber cables within the module 10 while providing cable management/routing functionality.

Figure 21:
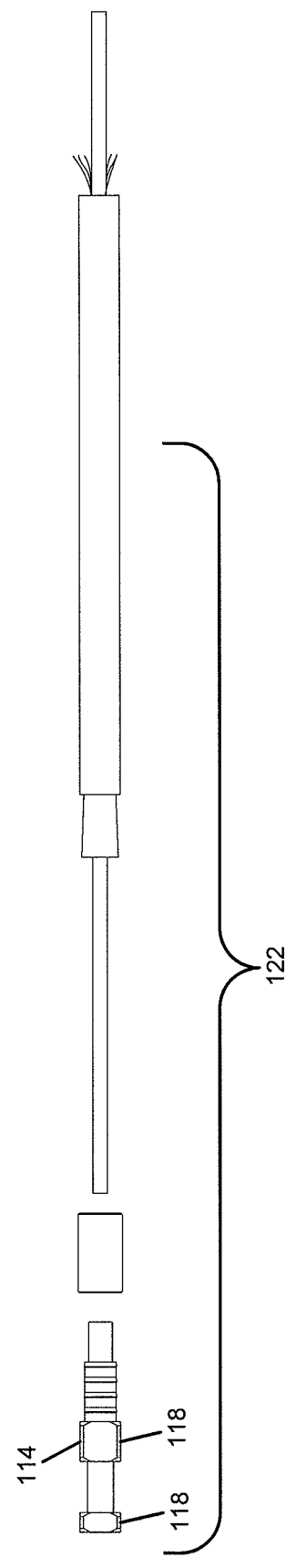
FIG. 21 is an exploded view of an output connection for outputting a signal from the WDM module of FIG. 1.
Figure 22:
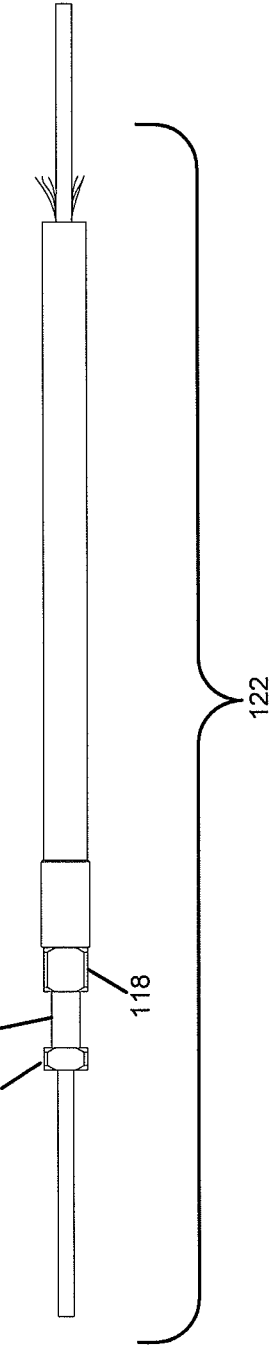
FIG. 22 illustrates the output connection of FIG. 21 in a fully assembled configuration.

Still referring to FIG. 5, the module main housing 14 also includes integrally formed crimp holders 112 (e.g., slots) adjacent the front wall 58 of housing 14 underneath the second radius limiter 110. Crimp elements 114 (see FIGS. 21-22) crimped to the ends of cables that are extending from the output locations 116 of the add/drop filters 22 are slidably received into the crimp holders 114. Crimp elements 114 include square flanges 118 between which are defined recessed portions 120. The crimp holders 112 include complementary structure to the crimp elements 114 such that once the crimp elements 114 are slidably inserted into the crimp holders 112, the crimp elements 114 are prevented from moving in a longitudinal direction due to the flanges 118. Once slidably inserted, crimp elements 114 are held in place by the cover 16 that is mounted on the module main housing 14. The assembly of an output connection 122 for outputting a signal from the WDM module 10 is shown in detail in FIGS. 21 and 22. A crimp element 114 is crimped and terminated to a cable in a manner commonly known in the art.

Figure 28:
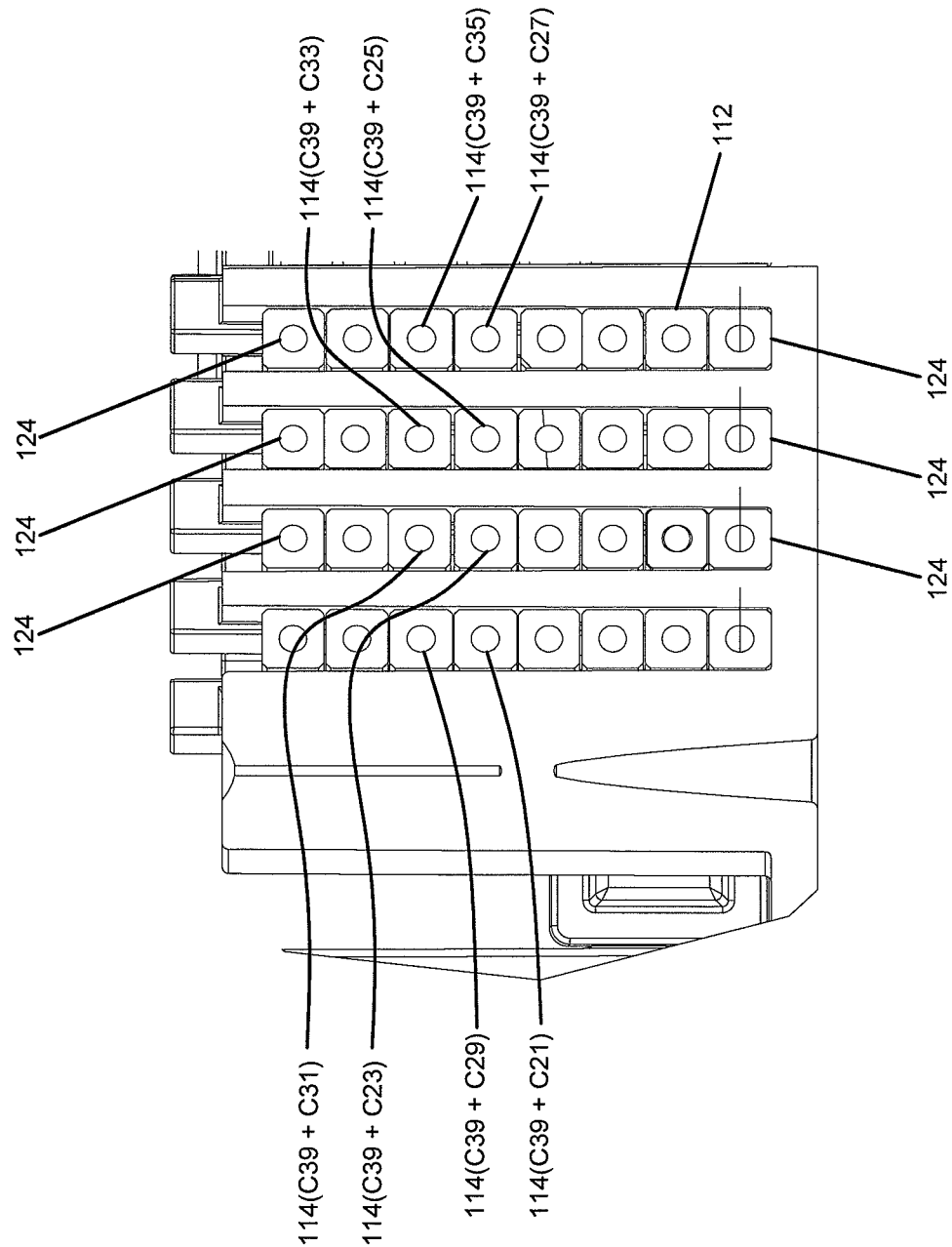
FIG. 28 is a diagram illustrating an example positioning of a plurality of output connections of the WDM module among a plurality of filler crimp tubes.

In the embodiment shown, there are four crimp holding slots 112, each slot 112 being able to accommodate up to eight crimp elements 114 (see FIG. 28). Since there are eight combination output signals in the embodiment of the WDM module 10 shown, the output cables 34 occupy eight crimp holding positions 124. The rest of the positions 124 may be filled with dummy crimp elements or inserts/fillers that are not connected to cables, making sure the crimp elements 114 crimped to active output cables 34 do not slide out of the slots 112. In FIG. 28, one example positioning of a plurality of "active" crimp elements 114 among filler crimp elements is shown.

In the embodiment of the module shown, the crimp holders 112 provide the capacity for up to thirty-two crimp elements 114 connected to output cables 34. Thus, the WDM module 10 of the present disclosure could house, if desired, a 1×32 fiber optic splitter and a 32 channel multiplexer. Also, the configuration of the module housing 12 can certainly be modified to accommodate other number of inputs or outputs, as desired. In addition, other complementary shapes between the crimp elements 114 and the crimp holders 112 are possible to provide a slidable fit and to prevent axial movement of the crimp elements 114 within the crimp holders 112.

Still referring to FIG. 5, the first radius limiter 48 defines a curved wall 126. The curved wall 126 includes a first end 128 and a second end 130. The first and second ends 128, 130 of the curved wall 126 act as guides in positioning the multiplexer chip 20 within the main housing 14 (see FIGS. 23-27). Also as shown in FIGS. 23-27, the bottom wall 54 of the module main housing 14, the ends 128, 130 of the curved wall 126 of the first radius limiter 48, the splice holder 40 adjacent the top wall 52 of the module main housing 14 and a tab 132 extending from the crimp holding structure 112 define a frame structure around the multiplexer chip 20 for correctly positioning the multiplexer chip 20 within the interior of the main housing portion 14. As shown in FIGS. 1 and 23-27, once the multiplexer chip 20 is placed within the main housing portion 14, the fiber optic splitter 18 and the add/drop filters 22 are placed next adjacent thereto and held within the module 10 against the chip 20 by the removable cover 16.

As noted above, the fiber retainer 46 may be placed on the main housing portion 14 to keep cables wrapped around the first radius limiter 48. The fiber retainer 46 is planar and includes a circular shape to match the contour of the curved portion 74 of the rear wall 56 of the main housing 14. The fiber retainer 46 includes three tabs 134 positioned around the periphery. The three tabs 134 are placed within slots 136 formed around the curved portion 74 of the rear wall 56. The fiber retainer 46 includes a circular opening 138 which accommodates a portion of the first radius limiter 48 that protrudes through the opening 138. When the fiber retainer 46 is placed on the main housing portion 14, it lies flush with the main housing portion 14 and is held thereagainst by the cover 16.

FIG. 5 also illustrates the cover 16 of the WDM module 10. The cover 16 is configured to be fastened to the module main housing portion 14. The cover 16 defines a similar contour as the main housing portion 14 and captures the internal components within the module 14. The cover 16 includes protruding portions 140 defined around the periphery and slots 142 defined between the protruding portions 140 that intermate with corresponding structures located around the periphery of the main housing 14 for correctly placing the cover 16 onto the main housing 14.

Figure 6:
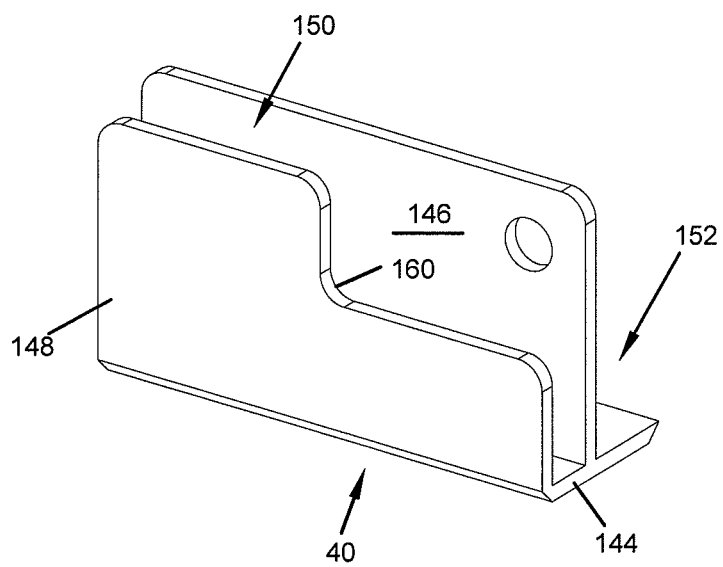
FIG. 6 is a perspective view of a splice holder/cable management structure of the WDM module of FIG. 1.
Figure 7:
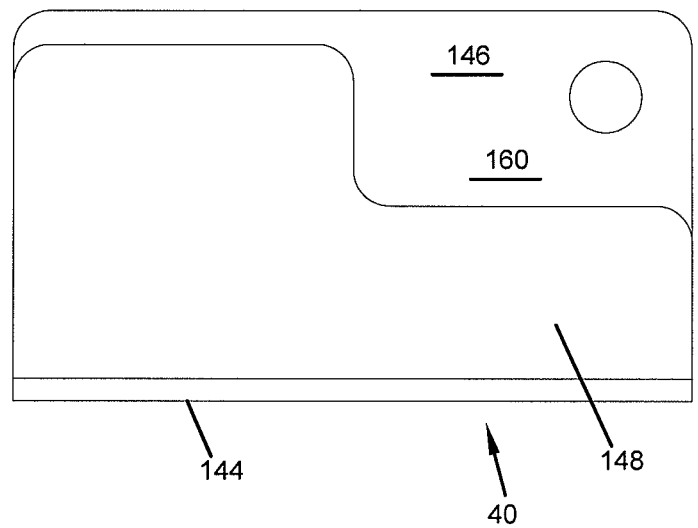
FIG. 7 is a bottom view of the splice holder/cable management structure of FIG. 6.
Figure 8:
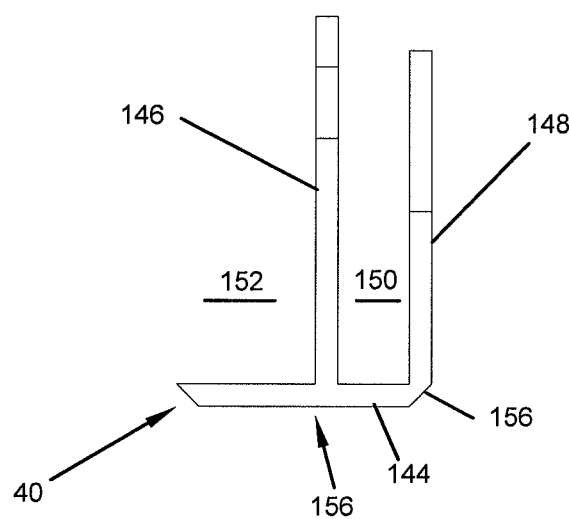
FIG. 8 is a front view of the splice holder/cable management structure of FIG. 6.

FIGS. 6-8 illustrate the splice holder/cable management structure 40 of the WDM module 10 in detail. The splice holder/cable management structure 40 is configured to be placed within the module 10 between the top wall 52 and the multiplexer chip 20 (see FIGS. 1 and 23-27). The splice holder 40 includes a first wall 144 and second and third integral sidewalls 146, 148 extending perpendicularly from the first wall 144. The second and third sidewalls 146, 148 define a channel 150 therebetween for guiding fiber optic cables therethrough. When the splice holder/cable management structure 40 is placed within the module 10, the third wall 148 rests against the multiplexer chip 20 (see FIGS. 23-27). And, when mounted, the second wall 146 and the top wall 52 of the main housing portion 14 of the module 10 define a pocket 152 for placing the fiber optic splice elements 42 therein. The second wall 146 keeps the fiber optic splice elements 42 in the pocket 152 separated from the fiber optic cables passing through the channel 150 defined between the second and third sidewalls 146, 148. In this manner, any epoxy residue remaining in the splice area is kept away from the cables passing through the channel 150.

As will be discussed in further detail below, when the module input 82 for the splitter 18 is first routed to the fiber optic splitter input 154 (see FIG. 23), the cable may pass through the pocket 152, over the splice elements 42. Similarly, the module input 84 for the multiplexer chip 20 may pass through the pocket 152, over the splice elements 42, when being routed to the input location 158 of the multiplexer chip (see FIG. 25).

Still referring to FIGS. 6-8, the third wall 148 of the splice holder/cable management structure 40 may include an inset portion defined by a notch 160 for accommodating fiber optic cables wrapped around a spool 162 defined by the first radius limiter 48. The notch 160 on the third wall 148 allows for expansion of fiber optic cables around the spool 162.

Figure 11:
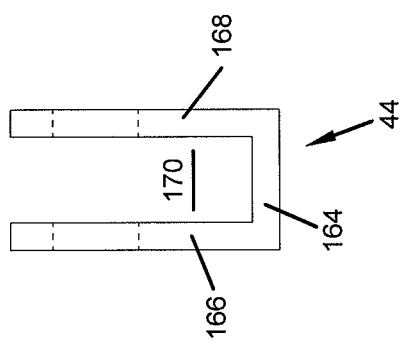
FIG. 11 is a front view of the cable management structure of FIG. 9.
Figure 9:
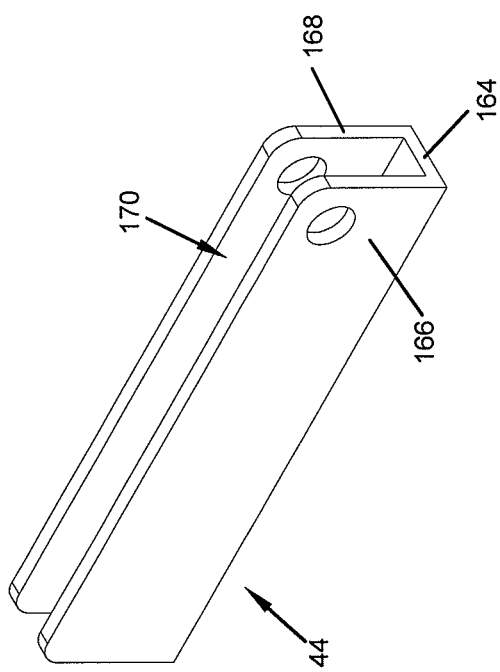
FIG. 9 is a perspective view of another cable management structure of the WDM module of FIG. 1.
Figure 10:
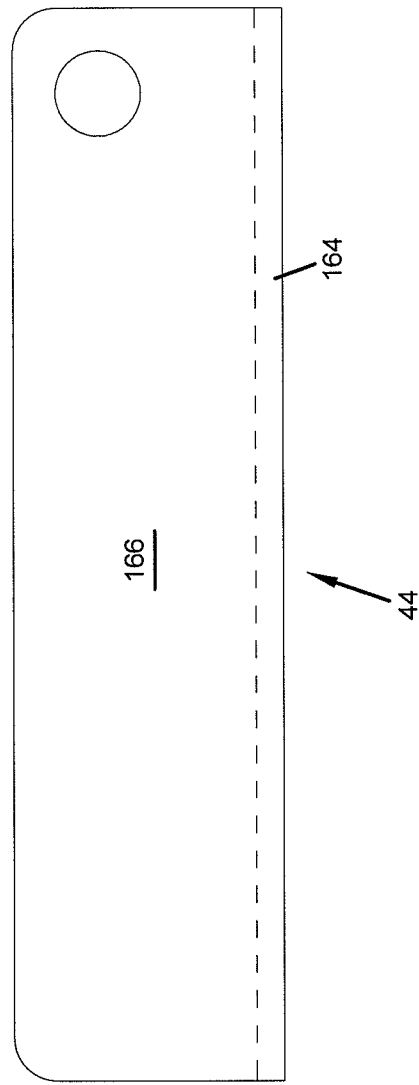
FIG. 10 is a top view of the cable management structure of FIG. 9.

FIGS. 9-11 illustrate the cable management structure 44 of the WDM module 10. The cable management structure 44 is configured to be placed into the module 10 after the placement of the multiplexer chip 20. In one embodiment, the cable management structure 44 is configured to be located between the fiber optic splitter 18 and the add/drop filters 22. As mentioned previously, in other embodiments, the cable management structure 44 may be located between the fiber optic splitter 18 and the bottom wall 54 of the module housing 14. The cable management structure 44 includes a U-shaped configuration with a first wall 164 and integral second and third sidewalls 166, 168 defining a channel 170 therebetween. The channel 170 guides fiber optic cables therethrough when routed within the module 10 as will be discussed in further detail below.

Now referring back to FIG. 1, when the module 10 is assembled, the multiplexer chip 20 is placed into the main housing 14 first. The fiber optic splitter 18 and the add/drop filters 22 are placed after the multiplexer chip 20 with the splitter 18 being separated from the add/drop filters 22 by the cable management structure 44. As noted previously, the cable management structure 44 may be located between the splitter 18 and the bottom wall 54 of the main housing 14. Splice elements 42 are located adjacent the top wall 52 of the main housing 14 and are separated from the multiplexer chip 20 by the splice holder/cable management structure 40. The fiber retainer 46 is placed on the first radius limiter 48 after the fiber cables have been routed to keep the fiber cables wrapped around the spool 162 of the first radius limiter 48. The cover 16 holds the internal components of the module 10 within the housing 12.

The WDM module 10 is shown in FIGS. 23-27 with the cover 16 and the fiber retainer 46 removed from the main housing portion 14 to illustrate the internal components and the routing of the cables therein. It should be noted that the routing of the cables illustrated in FIGS. 23-27 represents simply one example arrangement for the depicted module 10 and other arrangements are certainly possible.

Figure 23:
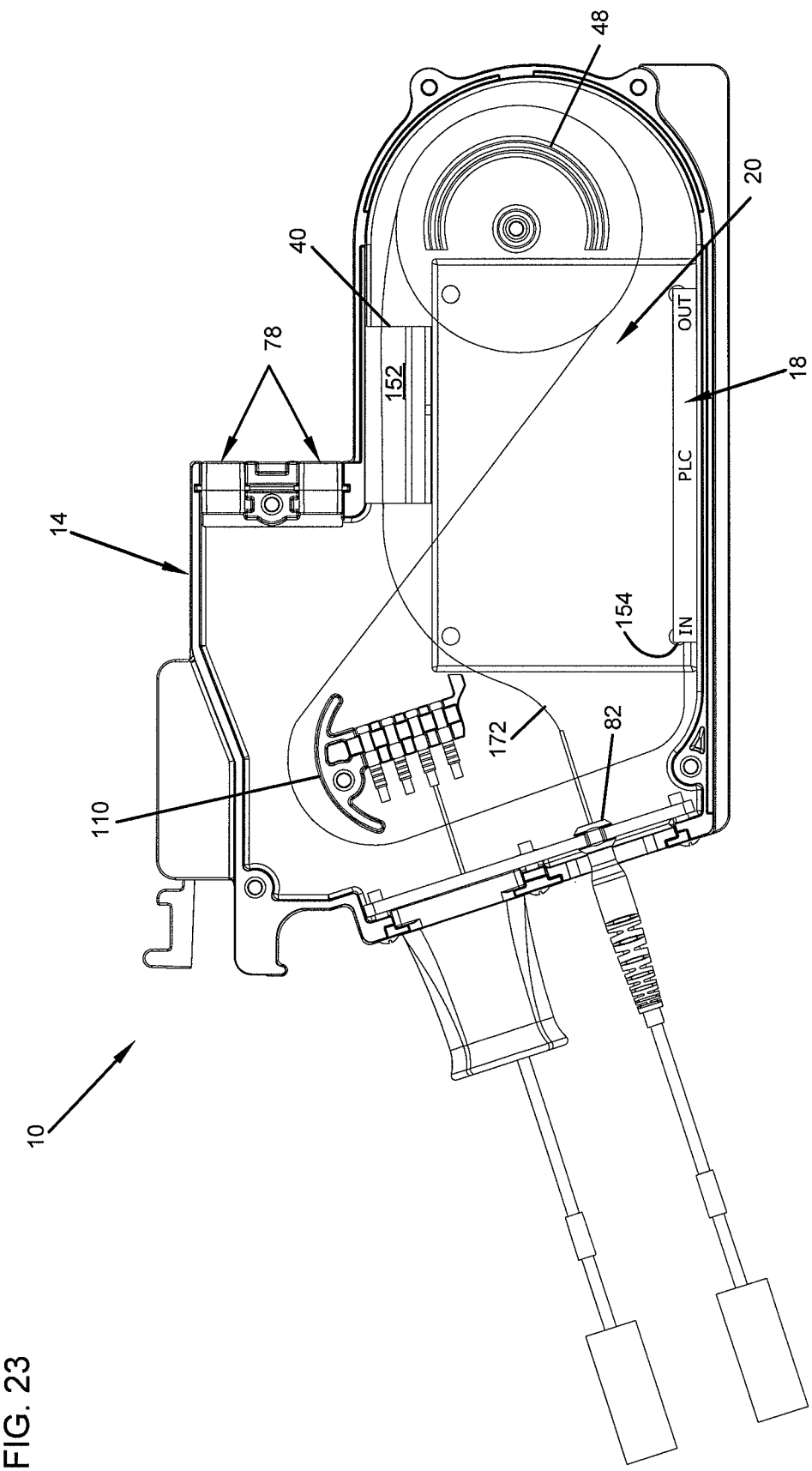
FIG. 23 illustrates an example routing of a fiber optic cable from an input connection of the WDM module to an input location of the fiber optic splitter within the WDM module.

In FIG. 23, an example routing arrangement of a first fiber optic cable 172 from an input location 82 of the WDM module 10 to an input location 154 of the fiber optic splitter 18 within the WDM module 10 is illustrated. A first cable 172 extends from the input connection location 82 of the module 10 upwardly toward the splice holder/cable management structure 40 and through the pocket 152 defined at the splice location, over the splice elements 42 (not shown in FIG. 23). From the splice holder/cable management structure 40, the first cable 172 extends downwardly and around the first radius limiter 48 and is spooled around the first radius limiter 48 as many times as necessary. After leaving the first radius limiter 48, the first cable 172 extends toward the front of the module 10 upwardly and around the second radius limiter 110. From the second radius limiter 110, the first cable 172 extends downwardly and to the input location 154 of the fiber optic splitter 18. The fiber optic splitter 18 splits the optical signal into a plurality of signals. In the given embodiment, a 1×8 splitter is used, and, thus the signal from the first cable 172 may be split into eight signals.

It should be noted that various different types of fiber optic splitters may be used within the module 10. According to one embodiment, the fiber optic splitters may split an input signal into a plurality of the same signals. In other embodiments, fiber optic splitters that split the input signal into different power levels (i.e., different ratios), rather than into the same signal, may be used.

Figure 24:
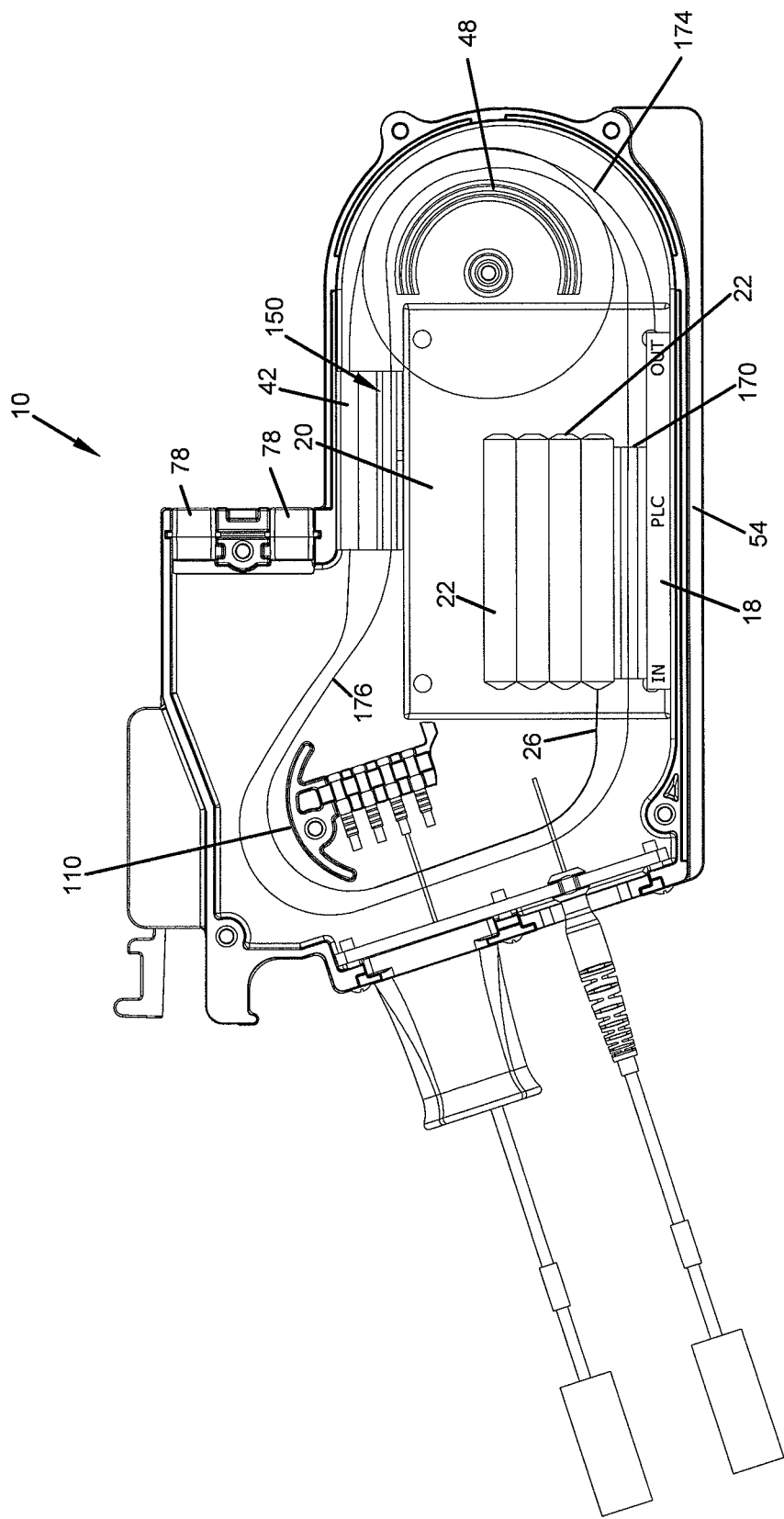
FIG. 24 illustrates an example routing of a fiber optic cable from an output location of the fiber optic splitter to an input location of an optical add/drop filter that is configured to combine a split signal and a demultiplexed wavelength into a single output fiber.

In FIG. 24, an example routing of a fiber optic cable 174 from an output location 24 of the fiber optic splitter 18 to an input location 26 of an add/drop filter 22 that is configured to combine a split signal and a demultiplexed wavelength into a single output signal is illustrated. It should be noted that only one of the eight fiber cables 174 from the splitter 18 to the add/drop filter 22 is illustrated for clarity purposes. Other seven of the split signals carried by seven other fiber cables 174 would follow a similar path to the one that will be described.

Referring to FIG. 24, the second cable 174 extends from the output location 24 of the splitter 18 and upwardly around the first radius limiter 48. The second cable 174 is spooled around the first radius limiter 48 as many times as needed. From the first radius limiter 48, the second cable 174 starts to extend toward the splice holder/cable management structure 40 and is spliced at the splice location to a third cable 176. The third cable 176 extends toward the front of the module 10 from the splice location and around the second radius limiter 110. From the second radius limiter 110, the third cable 176 extends downwardly and through the channel 170 formed by the cable management structure 44 located between the splitter 18 and the add/drop filters 22 and toward the rear of the module 10. From the channel 170, the third cable 176 goes upwardly around the first radius limiter 48 as many times as needed and through the channel 150 defined by the splice holder/cable management structure 40 toward the front of the module 10. From the splice holder/cable management structure 40, the third cable 176 goes around the second radius limiter 110 once again and downwardly to the input location 26 of the add/drop filter 22 (i.e., the PASS leg of the filter 22).

Figure 25:
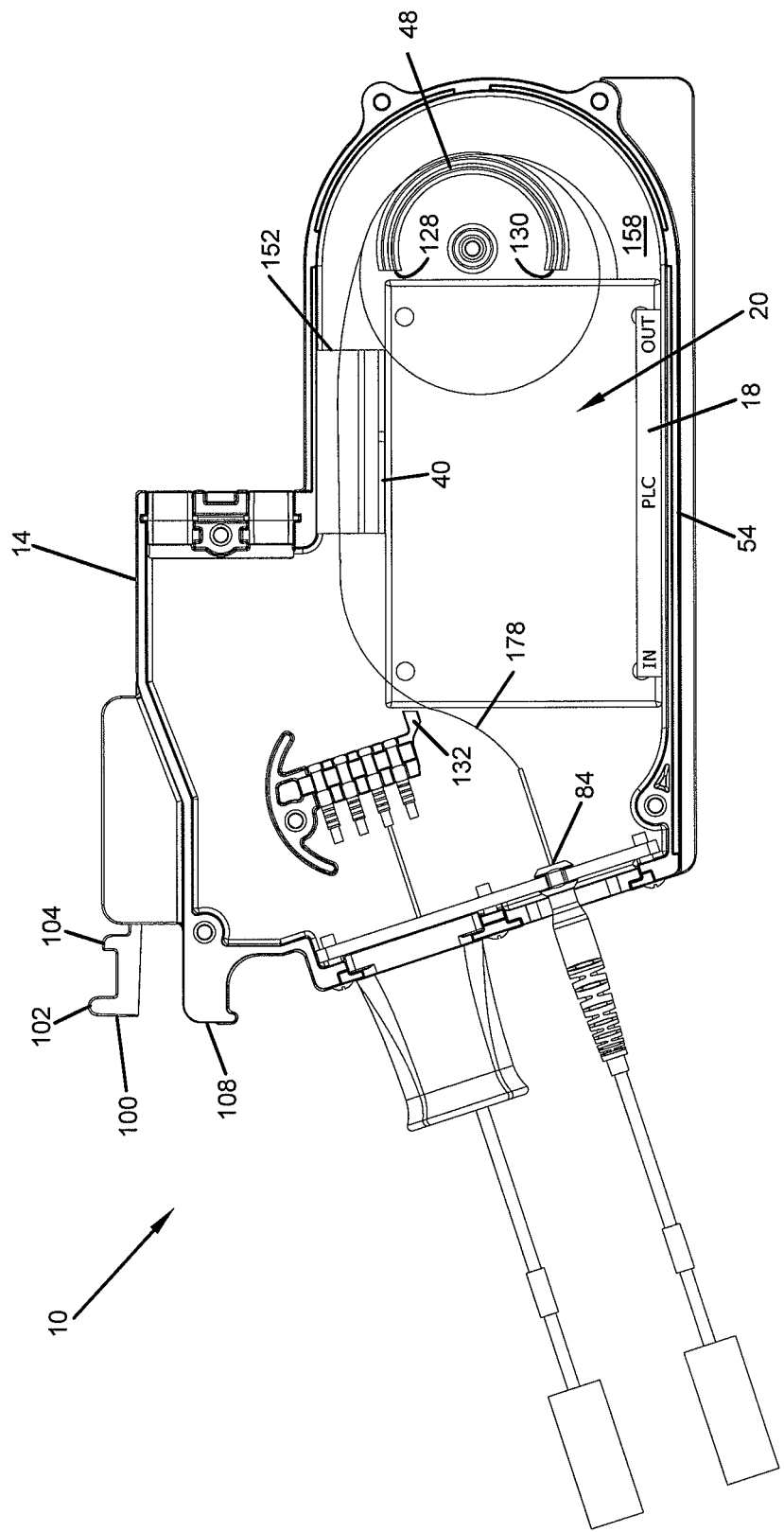
FIG. 25 illustrates an example routing of a fiber optic cable from an input connection of the WDM module to an input location of the multiplexer chip within the WDM module.

In FIG. 25, an example routing of a fiber optic cable 178 from an input location 84 of the WDM module 10 to an input location 158 of the multiplexer chip 20 within the WDM module 10 is illustrated.

Referring to FIG. 25, the fourth cable 178 extends from the input connection 84 of the module 10 upwardly toward the splice holder/cable management structure 40 and through the pocket 152 defined at the splice location, over the splice elements 42 (not shown in FIG. 25). From there, the fourth cable 178 extends downwardly and around the first radius limiter 48 and is spooled around the first radius limiter 48 as many times as needed. After leaving the first radius limiter 48, the fourth cable 178 ends up at the input location 158 of the multiplexer chip 20. The multiplexer chip 20 demultiplexes the optical signal carried by the fourth cable 178 into different wavelengths of laserlight. In the given embodiment, an 8-channel multiplexer chip is used, and, thus, the signal from the fourth cable 178 will be demultiplexed into eight different wavelengths.

Figure 26:
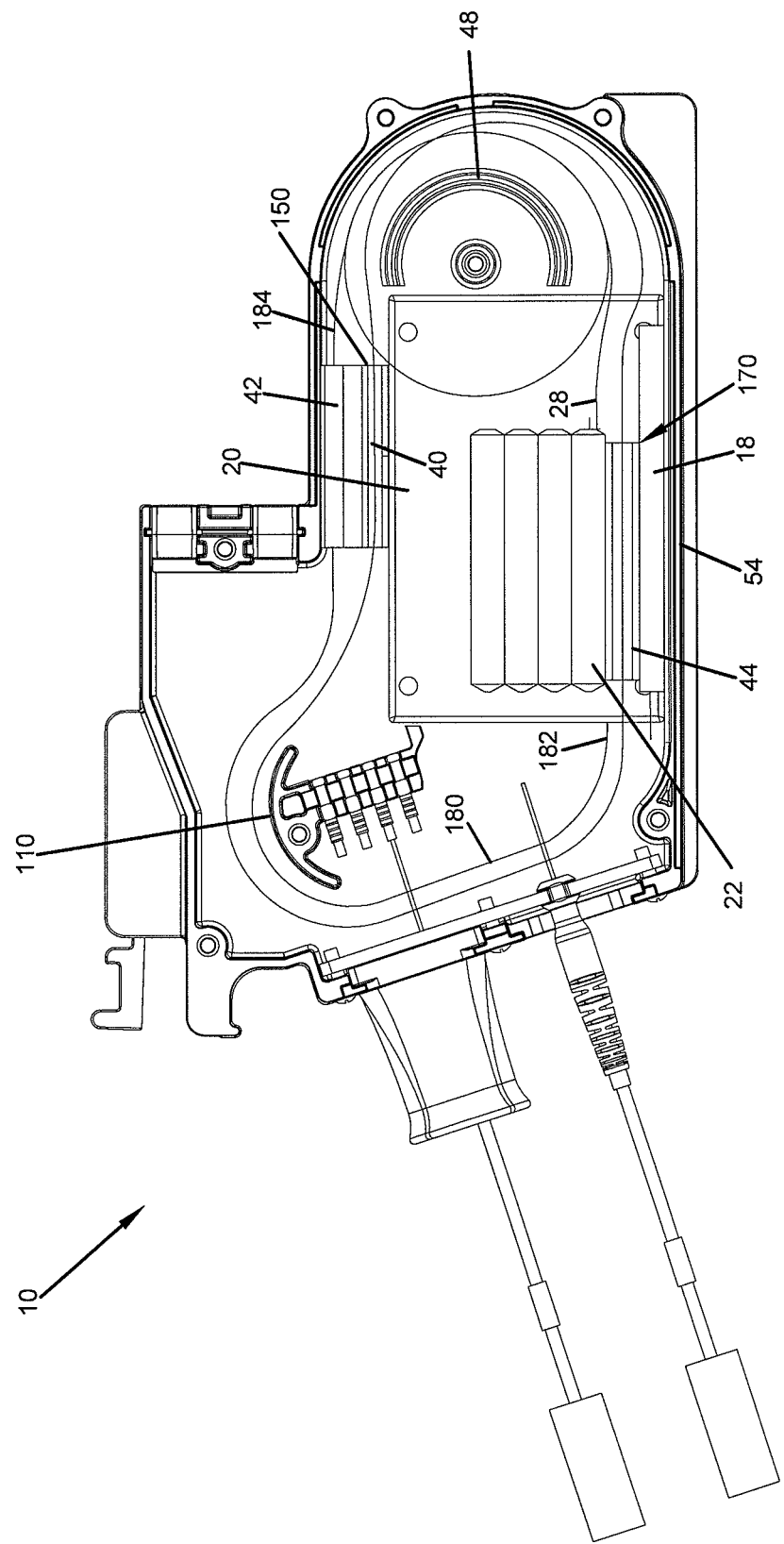
FIG. 26 illustrates an example routing of a fiber optic cable from an output location of the multiplexer chip to an input location of an optical add/drop filter that is configured to combine a split signal and a demultiplexed wavelength into a single output fiber.

In FIG. 26, an example routing of a fiber optic cable 180 from an output location 182 of the multiplexer chip 20 to an input location 28 of an add/drop filter 22 that is configured to combine a split signal and a demultiplexed wavelength into a single output signal is illustrated. It should be noted that routing of only one of the eight fiber cables 180 from the multiplexer chip 20 to the add/drop filter 22 is illustrated for clarity purposes. Other seven of the cables 180 carrying the other seven demultiplexed wavelengths would follow a similar path to the one that will be described.

Referring to FIG. 26, the fifth cable 180 extends from the output location 182 of the multiplexer chip 20 and upwardly and around the second radius limiter 110. From the second radius limiter 110, the fifth cable 180 extends toward the rear of the module 10 through the channel 150 defined by the splice holder/cable management structure 40. From the splice holder/cable management structure 40, the fifth cable 180 extends downwardly around the first radius limiter 48 as many times as needed. From the first radius limiter 48, the fifth cable 180 extends toward the front of the module 10 through the channel 170 formed by the cable management structure 44. From the cable management structure 44, the fifth cable 180 extends upwardly toward the second radius limiter 110 and around the second radius limiter 110. From the second radius limiter 110, the fifth cable 180 extends toward the splice holder/cable management structure 40 and is spliced at the splice location to a sixth cable 184. The sixth cable 184 extends from the splice location toward the rear of the module 10 and around the first radius limiter 48. The sixth cable 184 is spooled around the first radius limiter 48 as many times as needed. From the first radius limiter 48, the sixth cable 184 extends toward the front of the module 10 to the input location 28 of the add/drop filter 22 (i.e., REF leg of the filter 22).

Figure 27:
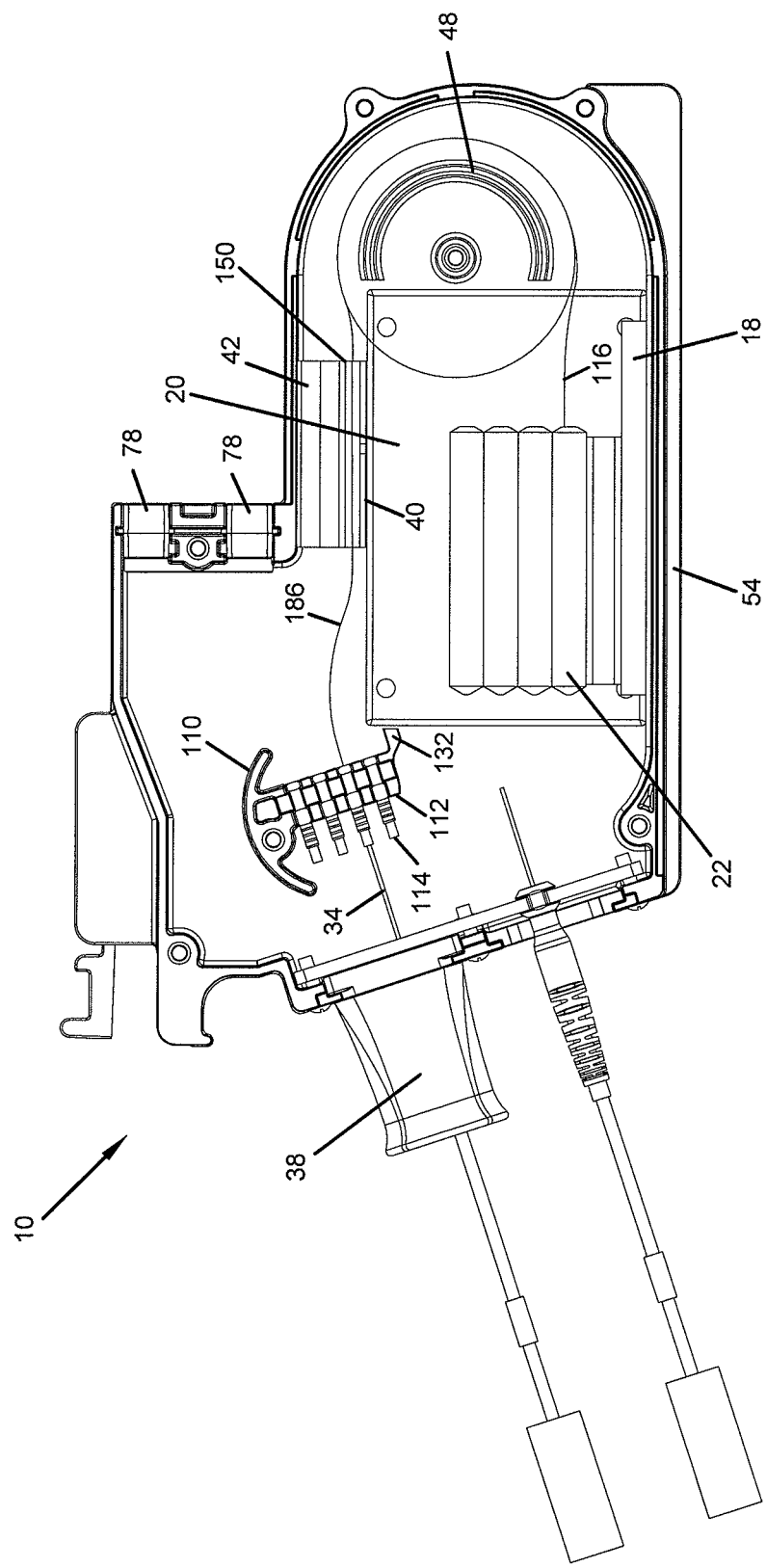
FIG. 27 illustrates an example routing of a fiber optic cable from an output location of the optical add/drop filter that is configured to combine a split signal and a demultiplexed wavelength to an output connection of the WDM module.

In FIG. 27, an example routing of a fiber optic cable 186 from an output location 116 of the add/drop filter 22 (i.e., COM leg of filter 22) that is configured to combine a split signal and a demultiplexed wavelength to an output signal of the WDM module 10 is illustrated.

Referring to FIG. 27, the seventh cable 186 carrying a combination signal extends from the output 116 of the add/drop filter 22 toward the rear of the module 10. The seventh cable 186 extends upwardly around the first radius limiter 48 and is spooled around the first radius limiter 48 as many time as needed. From the first radius limiter 48, the seventh cable 186 extends toward the front of the module 10 through the channel 150 defined by the splice holder/cable management structure 40. From the splice holder/cable management structure 40, the seventh cable 186 is led to the crimp holders 112 of the module 10 and is crimped to a crimp element 114. The eighth cable 34 (i.e., output cable 34) extends from the other end of the crimp element 114 to the cable exit 38 of the module 10. It should be noted that the routing for only one of the cables going from the add/drop filter output 116 to the module output has been described for clarity purposes. There are eight add/drop filters 22 for combining a split signal and a demultiplexed wavelength. Each of the cables extending from each add/drop filter output 116 to the module exit 38 may follow a similar path to that described above.

As noted above, the routing of the fiber optic cables within module 10 as shown in FIGS. 23-27 is only one example and other ways of routing the cables within the module 10 are possible.

As noted previously, according to one embodiment, the WDM module 10 may house an 8-channel wavelength division multiplexing chip. According to another embodiment, the WDM module 10 may house a 4-channel wavelength division multiplexing chip. According to another embodiment, the WDM module 10 may house a 16-channel wavelength division multiplexing chip. In other embodiments, the module 10 may house other types of wavelength division multiplexing chips. In all the embodiments, the WDM module 10 may house fiber optic splitters that are configured to split a signal into a number of signals corresponding to the number of demultiplexed wavelengths. The fiber optic splitters used may power split the signal into the same signals or into different power levels/ratios.

The disclosures of the following U.S. Patents are also incorporated herein by reference in their entirety: U.S. Pat. No. 5,363,465, issued Nov. 8, 1994, entitled FIBER OPTIC CONNECTOR MODULE; U.S. Pat. No. 5,317,663, issued May 20, 1993, entitled ONE-PIECE SC ADAPTER; U.S. Pat. No. 7,376,322, issued May 20, 2008, entitled FIBER OPTIC MODULE AND SYSTEM INCLUDING REAR CONNECTORS; U.S. Pat. No. 7,400,813, issued Jul. 15, 2008, entitled FIBER OPTIC SPLITTER MODULE; U.S. Pat. No. 7,376,323, issued May 20, 2008, entitled FIBER OPTIC ADAPTER MODULE; and U.S. Pat. No. 7,346,254, issued Mar. 18, 2008, entitled FIBER OPTIC SPLITTER MODULE WITH CONNECTOR ACCESS.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. A telecommunications module comprising:
   a housing defining a rear wall and a front wall, the housing extending in a longitudinal direction from the front wall toward the rear wall;
   a first module input location and a second module input location defined by the housing;
   a module output location defined by the housing;

an optical wavelength division multiplexer/demultiplexer mounted at the housing and having a multiplexer length extending generally parallel to the longitudinal direction of the housing, the optical wavelength division multiplexer/demultiplexer configured to demultiplex an optical signal input into the telecommunications module via the first module input location into a plurality of different wavelengths;

a fiber optic splitter mounted at the housing and having a splitter length extending generally parallel to the longitudinal direction of the housing the fiber optic splitter configured to split an optical signal input into the telecommunication module via the second module input location into a plurality of signals; and a plurality of optical add/drop filters mounted at the housing, each of the optical add/drop filters having a filter length extending generally parallel to the longitudinal direction of the housing, each of the optical add/drop filters configured to combine one of the signals that has been split by the fiber optic splitter and one of the wavelengths that has been demultiplexed by the optical wavelength division multiplexer/demultiplexer into a combination output signal that is output by the telecommunications module through the module output location.

2. A telecommunications module according to claim 1, further comprising a first cable management structure located adjacent the rear wall for guiding cables extending within the housing, the first cable management structure including a spool defining a curved wall.

3. A telecommunications module according to claim 2, further comprising a second cable management structure located adjacent the front wall for guiding cables extending within the housing, the second cable management structure including a curved wall.

4. A telecommunications module according to claim 1, wherein the fiber optic splitter is a 1×8 splitter, the optical wavelength division multiplexer/demultiplexer is an 8-channel multiplexer/demultiplexer, and the plurality of optical add/drop filters includes eight optical add/drop filters.

5. A telecommunications module according to claim 1, further including a top flange, a bottom flange, and a flexible latch adjacent the front wall, for slidable insertion into a telecommunications chassis.

6. A telecommunications module according to claim 1, further comprising cable splice elements having lengths extending generally parallel to the longitudinal direction of the housing, the splice elements being for splicing cables extending between the optical wavelength division multiplexer/demultiplexer and the optical add/drop filters and cables extending between the fiber optic splitter and the optical add/drop filters.

7. A telecommunications module according to claim 1, wherein the optical wavelength division multiplexer/demultiplexer, the fiber optic splitter, and the optical add/drop filters are removably mounted within the housing, the telecommunications module further comprising a removable cover to obtain access to the optical wavelength division multiplexer/demultiplexer, the fiber optic splitter and the optical add/drop filters.

\* \* \* \* \*